US012688397B2

(12) United States Patent
Malik et al.

(10) Patent No.: US 12,688,397 B2
(45) Date of Patent: Jul. 21, 2026

(54) PARTITIONABLE DIGITAL HARDWARE SYSTEM FOR IMPLEMENTING RECURRENT NEURAL NETWORKS

(71) Applicant: Applied Brain Research Inc., Waterloo (CA)

(72) Inventors: Gurshaant Singh Malik, Waterloo (CA); Aaron Russell Voelker, Waterloo (CA); Christopher David Eliasmith, Waterloo (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 1022 days.

(21) Appl. No.: 17/244,797

(22) Filed: Apr. 29, 2021

(65) Prior Publication Data

US 2021/0342668 A1 Nov. 4, 2021

Related U.S. Application Data

(60) Provisional application No. 63/017,479, filed on Apr. 29, 2020.

(51) Int. Cl.
| | |
|---|---|
| *G06N 3/044* | (2023.01) |
| *G06F 7/544* | (2006.01) |
| *G06F 9/38* | (2018.01) |
| *G06N 3/063* | (2023.01) |

(52) U.S. Cl.
CPC ............. *G06N 3/044* (2023.01); *G06F 7/544* (2013.01); *G06F 9/3885* (2013.01); *G06N 3/063* (2013.01); *G06F 2207/4812* (2013.01); *G06F 2207/4824* (2013.01)

(58) Field of Classification Search
CPC ................... G06F 9/3885; G06F 7/544; G06F 2207/4812; G06F 2207/4824
USPC .......................................................... 712/11
See application file for complete search history.

(56) References Cited

U.S. PATENT DOCUMENTS

| | | | |
|---|---|---|---|
| 8,930,291 B1 | 1/2015 | Srinivasa et al. | |
| 10,394,210 B2 | 8/2019 | Cella et al. | |
| 2017/0103305 A1* | 4/2017 | Henry | G06N 3/044 |
| 2018/0046897 A1* | 2/2018 | Kang | G06F 7/5443 |
| 2019/0087710 A1* | 3/2019 | Guo | G06N 3/04 |

OTHER PUBLICATIONS

Examiner Report dated Mar. 3, 2025 received in European Patent Application No. 21171296.3, 7 pgs.

(Continued)

*Primary Examiner* — Keith E Vicary
(74) *Attorney, Agent, or Firm* — Jenna L. Wilson; Wilson Lue LLP

(57) ABSTRACT

Recurrent neural networks are efficiently mapped to hardware computation blocks specifically designed for Legendre Memory Unit (LMU) cells, Projected LSTM cells, and Feed Forward cells. Iterative resource allocation algorithms are used to partition recurrent neural networks and time multiplex them onto a spatial distribution of computation blocks, guided by multivariable optimizations for power, performance, and accuracy. Embodiments of the invention provide systems for low power, high performance deployment of recurrent neural networks for battery sensitive applications such as automatic speech recognition (ASR), keyword spotting (KWS), biomedical signal processing, and other applications that involve processing time-series data.

17 Claims, 15 Drawing Sheets

(56)        References Cited

OTHER PUBLICATIONS

Li Zhe et al: "E-RNN: Design Optimization for Efficient Recurrent Neural Networks in FPGAs", 2019 IEEE International Symposium on High Performance Computer Architecture (HPCA), IEEE, Feb. 16, 2019 (Feb. 16, 2019), pp. 69-80, XP033532552, DOI: 10.1109/ HPCA.2019.00028 [retrieved on Mar. 26, 2019].

* cited by examiner

PARTITIONABLE DIGITAL HARDWARE SYSTEM FOR IMPLEMENTING RECURRENT NEURAL NETWORKS

This application claims priority to provisional application No. 63/017,479, filed Apr. 29, 2020, the contents of which are herein incorporated by reference.

TECHNICAL FIELD

The invention relates generally to digital hardware systems, such as digital circuits, and more particularly to methods and digital circuit hardware systems for efficient processing of recurrent neural networks.

BACKGROUND

There are a wide variety of recurrent neural networks (RNNs) available, including those based on Long Short Term Memories (LSTMs), Legendre Memory Units (LMUs), and many variants of these. However, commercially viable RNNs have several constraints often ignored by research focused efforts. In this more constrained setting, these RNNs must be:

(1) High performance: The most responsive, low-latency networks will process data as soon as it is available, without any buffering. Many methods are often tested on the assumption that large windows of data are available all at once and can be easily accessed from memory. However, at deployment, buffering large amounts of data into memory introduces undesirable latencies as well as increases overall size and consequently power consumption of such an implementation. This particular requirement imposes strict bounds on end to end latency and throughput while processing such a recurrent neural network. For a real time processing of recurrent neural networks, end to end latency must be minimised and throughput of the implementation maximised.

(2) Power efficient: For RNN applications sensitive to power dissipation, like battery powered automatic speech recognition, keyword spotting, etc, the amount of power consumed by processing of such RNNs becomes important. While there is no sole determiner of power efficiency, quantization, the number and types of operations, number and types of memory accesses as well as static power dissipation of underlying hardware are all important factors.

Thus, commercially viable recurrent neural networks mandate a custom hardware design that not only supports a wide variety of typical layers that constitute a RNN like LMU, projected LSTMs and Feed Forward cells but also allows for highly efficient and distributed mapping of said RNN layers onto the hardware by taking into account unique constraints related to power, performance or a combination of both. For this, such hardware designs should also provide theoretical performance and power models to accurately calculate performance and power metrics of mapping of a given RNN onto the hardware design.

A distinguishing feature of the Legendre Memory Unit (LMU) (see Voelker, A. R., Kajić, I. and Eliasmith, C., 2019. Legendre memory units: Continuous-time representation in recurrent neural networks), consisting of linear 'memory layers' and a nonlinear 'output layer', is that the linear memory layers are optimal for compressing an input time series over time. Because of this provable optimality, the LMU has fixed recurrent and input weights on the linear layer. The LMU outperforms all previous RNNs on the standard psMNIST benchmark task by achieving 97.15-

98.49% test accuracy (see Voelker, A. R., Kajić, I. and Eliasmith, C., 2019. Legendre memory units: Continuous-time representation in recurrent neural networks), compared to the next best network (dilated RNN) at 96.1% and the LSTM at 89.86%, while using far fewer parameters 102,000 versus 165,000 (a reduction of 38%). While a hardware based implementation of the A and B weights of LMU is available (see Voelker, A. R., Kajić, I. and Eliasmith, C., 2019. Legendre memory units: Continuous-time representation in recurrent neural networks), there is no hardware design, complete with performance and power models, that can implement an LMU of varying size and characteristics in a highly efficient and distributed manner, all the while being compatible to interface with hardware implementations of projected LSTMs (see Sak, H., Senior, A. W. and Beaufays, F., 2014. Long short-term memory recurrent neural network architectures for large scale acoustic modeling) or feed forward cells of the RNN.

As an alternative to the large size of the standard Long Short Term Memory (LSTM) cells, the Projected Long Short Term Memory (LSTM-P/Projected LSTM) cell architecture is proposed (see Sak, H., Senior, A. W. and Beaufays, F., 2014. Long short-term memory recurrent neural network architectures for large scale acoustic modeling) that projects the hidden states of the LSTM onto a smaller dimension, thus reducing the number, and thus memory requirements, of the recurrent connection. While there have been many hardware based implementations of the standard LSTM (see Chang, A. X. M., Martini, B. and Culurciello, E., 2015. Recurrent neural networks hardware implementation on FPGA. arXiv preprint arXiv:1511.05552) to allow for different efficient implementations (see Zhang, Yiwei, Chao Wang, Lei Gong, Yuntao Lu, Fan Sun, Chongchong Xu, Xi Li, and Xuehai Zhou. "Implementation and optimization of the accelerator based on fpga hardware for lstm network." In 2017 IEEE International Symposium on Parallel and Distributed Processing with Applications and 2017 IEEE International Conference on Ubiquitous Computing and Communications (ISPA/IUCC), pp. 614-621. IEEE, 2017), (see Yazdani, R., Ruwase, O., Zhang, M., He, Y., Arnau, J. M. and Gonzalez, A., 2019. Lstm-sharp: An adaptable, energy-efficient hardware accelerator for long short-term memory. arXiv preprint arXiv:1911.01258), there currently is no hardware design that implements a well composed projected LSTM, complete with performance and power models, that can support LSTM and projection cells of varying sizes and characteristics in a highly efficient and distributed manner, all the while being compatible to interface with hardware implementations of LMUs and feed forward cells of the RNN.

The feed forward cell, while itself not being recurrent in nature, is generally a common part of RNNs, typically with multiples of such cells with a plurality of sizes, being used to extract low level features from the preceding recurrent states. While there have been many efficient hardware designs of feed forward cells (see Himavathi, S., Anitha, D. and Muthuramalingam, A., 2007. Feedforward neural network implementation in FPGA using layer multiplexing for effective resource utilization. IEEE Transactions on Neural Networks, 18(3), pp. 880-888) (see Canas, A., Ortigosa, E. M., Ros, E. and Ortigosa, P. M., 2006. FPGA implementation of a fully and partially connected MLP. In FPGA Implementations of Neural Networks (pp. 271-296). Springer, Boston, MA), that support processing of varying sizes and characteristics of these cells but there have been no designs that do so in the setting of recurrent neural networks; that is, being compatible to interface with hardware implementations of LMUs and LSTM-Ps cells of the RNN, while also providing power and performance models to enable highly efficient and distributed mapping of RNNs onto the digital hardware design.

There thus remains a need for improved methods and systems for efficient processing of recurrent neural networks for application domains including, but not limited to, automatic speech recognition (ASR), keyword spotting (KWS), biomedical signal processing, and other applications that involve processing time-series data.

SUMMARY OF THE INVENTION

A digital hardware system for processing time series data with a recurrent neural network, wherein the digital hardware system comprises a plurality of computation blocks, the digital hardware system computes parts of a given recurrent neural network by time multiplexing the parts of the recurrent neural network over a spatially distributed set of computation blocks of the digital hardware system wherein the digital hardware system is configured to read a sequence of time series data to be processed from the memory of the digital hardware system; temporally process the data by time multiplexing the recurrent neural network over the spatially distributed set of computation blocks of the digital hardware system; and, write final processed output or processed intermediate activations of the recurrent neural network to the memory of the digital hardware system.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
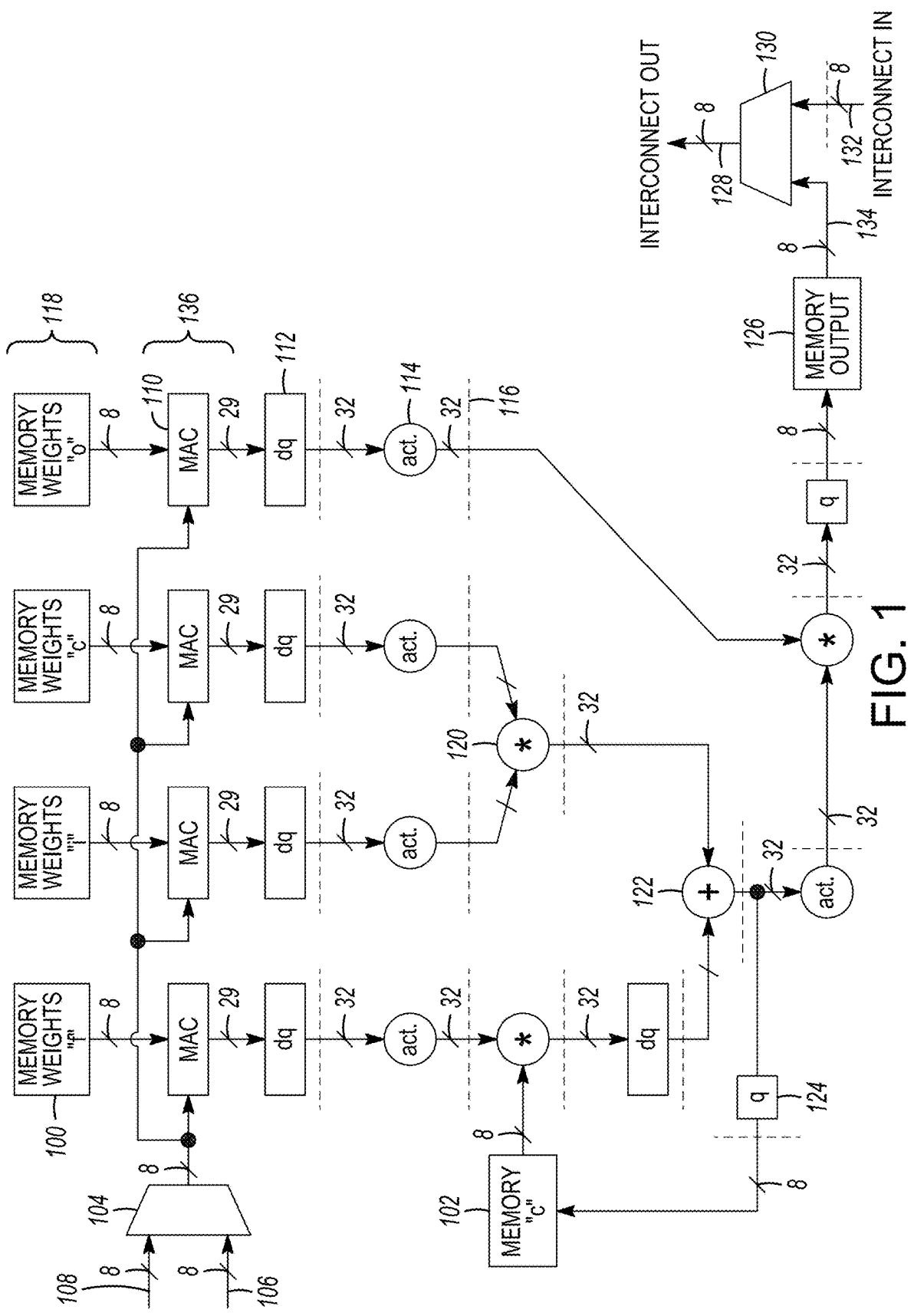
FIG. 1 illustrates a circuit embodiment of a LSTM cell's computation sub block (LB).

Having summarized the invention above, certain exemplary and detailed embodiments will now be described below, with contrasts and benefits over the prior art being more explicitly described.

It will be understood that the specification is illustrative of the present invention and that other embodiments suggest themselves to those skilled in the art. All references cited herein are incorporated by reference.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The main embodiment of the present invention provides digital hardware designs for processing of input of time series based data for a recurrent neural network where the parts of the recurrent neural network are composed of at least one of: an LMU cell, an LSTM-P cell, plus zero or Feed Forward cells. The input is processed by time multiplexing the parts of the recurrent neural network (RNN) over a spatially distributed set of these computation blocks of the digital hardware design, where a computation block refers to a digital hardware implementation of: an LMU cell or an LSTM-P cell or a Feed Forward cell. Each computation block is built by connecting together a plurality of computation sub blocks. The spatial distribution of computation blocks and time multiplexing of parts of the RNN over these computation blocks, referred to as "mapping" or "allocation", is determined by an algorithm that takes as input a set of user constraints related to latency, throughput, transistor count, power consumption and like. The mapping algorithm explores all combinations of partitioning the network, while for each unique partition combination, updating the spatial distribution and time multiplexing in an iterative fashion by identifying the slowest computation sub block until said user constraints are met.

Definitions of Key Terms

Various terms as used herein are defined below. To the extent a term used in a claim is not defined below, it should be given the broadest definition persons in the pertinent art have given that term as reflected in printed publications and issued patents at the time of filing.

As used herein, the term "LMU" refers to the Legendre Memory Unit recurrent cell, and in particular any neural network embodiment of equations 1 and 2 from Voelker et al. (2019), referred also to as the "linear layer", which is to be understood as a general component of a neural network, and is not limited in use within any one particular network architecture.

As used herein, the term "LSTM-P" refers to the Projected LSTM recurrent cell.

As used herein, the term "activation" refers to a function that maps an input to an output that includes, but is not limited to, functions such as rectified linear units, sigmoid, hyperbolic tangent, linear, etc. These functions might also be approximated for the purposes of hardware implementation, for example by way of thresholding, linear approximations, lookup-tables, etc.

As used herein, the term "vector" refers to a group of scalar values, where all scalar values of the group may be transformed by some arbitrary mathematical function in sequence or in parallel. The contents of a vector depend on context, and may include, but are not limited to, activities produced by activation functions, weights stored in SRAM, inputs stored in SRAM, outputs stored in SRAM, values along a datapath, etc.

As used herein, the term "computational sub block" refers to a digital hardware implementation responsible for carrying out a specific computation and composed of different operators including, but not limited to, multiply and accumulate blocks, adders, multipliers, registers, memory blocks, etc. Different types of computation sub blocks are responsible for carrying out different computations.

As used herein, the term "computational block" refers to a group of computation sub blocks responsible for carrying out computations assigned to it, with the group composed of plurality of different types of computation sub blocks, with members from the same group of computation sub blocks working in parallel to process parts or whole of computation assigned to their respective computation block.

As used herein, the term "time multiplexing" refers to the scheduling of a group of computations such that each computation in this group is carried out by computation sub block in order, that is, one after the other in time.

As used herein, the term "quantization" refers to the process of mapping a set of values to a representation with a narrower bit width as compared to the original representation. Quantization encompasses various types of quantization scaling including uniform quantization, power-of-two quantization, etc. as well as different types of quantization schemes including symmetric, asymmetric, etc.

As used herein, the term "quantization block" refers to a digital hardware block that performs a quantization operation.

As used herein, the term "dequantization" refers to the process of mapping a set of quantized values to the original bit width. Dequantization encompasses various types of dequantization scaling including uniform dequantization, power-of-two dequantization, etc. as well as different types of dequantization schemes including symmetric, asymmetric, etc.

As used herein, the term "dequantization block" refers to a digital hardware block that performs a dequantization operation.

A number of different variable notations are used to refer to the dynamic energy consumption, as follows:

$^{8,8}E_{memory}{}^{r}$: The dynamic Energy consumed by an memory read operation with read port width of 8 and a write port width of 8

$^{8,8}E_{memory}{}^{w}$: The dynamic Energy consumed by an memory write operation with read port width of 8 and a write port width of 8.

$^{8,8,29}E_{MAC}{}^{OP}$: The dynamic Energy consumed by a MAC operation with 2 input operands, each of width of 8 and an output with width 29.

$^{32,32}E_{act}{}^{OP}$: The dynamic Energy consumed by an activation operation with an input width of 32 bits and an output width of 32 bits.

$^{8,32,32}E_{mult}{}^{OP}$: The dynamic Energy consumed by a multiplication operation with 2 input operands, one of width 8 and other of width 32, and an output with width 32.

$^{32,32,32}E_{mult}{}^{OP}$: The dynamic Energy consumed by a multiplication operation with 2 input operands, each of width of 32 and an output with width 32.

$^{32,32,32}E_{adder}{}^{OP}$: The dynamic Energy consumed by an adder's operation with 2 input operands, each of width of 32 and an output with width 32.

$^{8,88}E_{2:1\ mux}{}^{OP}$: The dynamic Energy consumed by a 2:1 mux's line switch operation with 2 input operands, each of width of 8 and an output with width 8.

$^{8,8}E_{reg}{}^{OP}$: The dynamic Energy consumed by a register write+read operation with an input operand of width of 8 and an output width of 8.

$^{32,32}E_{reg}{}^{OP}$: The dynamic Energy consumed by a register write+read operation with an input operand of width of 32 and an output width of 32.

$^{8}E_{GEN-A}{}^{OP}$: The dynamic Energy consumed by state state matrix A's element generation operation with an output width of 8.

$^{8}E_{GEN-B}{}^{OP}$: The dynamic Energy consumed by state state matrix B's element generation operation with an output width of 8.

$^{29,32}E_{dq}{}^{OP}$: The dynamic energy consumed by a dequantization operation, with an input operand width of 29 and output width of 32.

$^{32,32}E_{dq}{}^{OP}$: The dynamic energy consumed by a dequantization operation, with an input operand width of 32 and output width of 32.

$^{32,8}E_{q}{}^{OP}$: The dynamic energy consumed by a quantization operation, with an input operand width of 32 and output width of 8.

A number of different variable notations are used to refer to the static leakage power, as follows:

$^{1×8}P_{memory}{}^{s}$: The static leakage power of a memory macro of size 1×8 (depth×width) bits.

$^{8,8,29}P_{MAC}{}^{s}$: The static leakage power of a MAC module with 2 operands, each of width 8 and an output width of 29.

$^{32,32}P_{act}{}^{s}$: The static leakage power of an activation module with an input width of 32 and an output width of 32.

$^{32,32,32}P_{mult}{}^{s}$: The static leakage power of a multiplier module with 2 operands, each of width of 32 and an output width of 32.

$^{8,32,32}P_{mult}{}^{s}$: The static leakage power of a multiplier module with 2 operands, one of width 8 and other of width 32 and an output width of 32.

$^{32,32,32}P_{adder}{}^{s}$: The static leakage power of an adder with 2 operands, each of width 32 and an output width of 32.

$^{8,8,8}P_{2:1\ mux}{}^{s}$: The static leakage power of a 2:1 mux module with 2 input operands, each of width 8 and an output width of 8.

$^{8,8}P_{reg}{}^s$: The static leakage power of a register with an input width of 8 and an output width of 8.

$^{32,32}P_{reg}{}^s$: The static leakage power of a register with an input width of 32 and an output width of 32.

$^8P_{GEN-A}{}^s$: The static leakage power of state state matrix A's element generator with an output width of 8.

$^8P_{GEN-B}{}^s$: The static leakage power of state state matrix B's element generator with an output width of 8.

$^{32,8}P_q{}^s$: The static leakage power of a quantization block with an input width of 32 and output width of 8.

$^{29,32}P_q{}^s$: The static leakage power of a dequantization block with an input width of 29 and output width of 32.

$^{32,32}P_{dq}{}^s$: The static leakage power of a dequantization block with an input width of 32 and output width of 32.

A number of different variable notations are used to refer to parameters of a particular network architecture, as follows:

$n_i$: The size of user input to the LSTM-P cell or the LMU cell.

$n_o$: The size of user input to the feed forward cell.

$n_r$: The size of hidden state of the LSTM-P cell or the LMU cell.

$n_c$: The size of the projection layer of the LSTM-P cell or the size of a memory tape for LMU cell.

$N_{c,\ next\_layer}$: The size of the projection layer of the next LSTM-P cell or the size of a memory tape for the next LMU cell.

num_LB$_{current}$: Number of LB sub computation blocks within the computation block responsible for processing the current layer.

num_LB$_{next\_layer}$: Number of LB sub computation blocks within the computation block responsible for processing the next layer.

unit$_k^{LB}$: Number of output units assigned to a LB sub computation block with index k, with $0 \leq k < $ num_LB$_{current}$.

num_PB$_{current}$: Number of PB sub computation blocks within the computation block responsible for processing the current layer.

unit$_k^{PB}$: Number of output units assigned to a PB sub computation block with index k, with $0 \leq k < $ num_PB$_{current}$.

num_UB$_{current}$: Number of UB sub computation blocks within the computation block responsible for processing the current layer.

unit$_k^{UB}$: Number of output units assigned to a UB sub computation block with index k, with $0 \leq k < $ num_UB$_{current}$.

num_MB$_{current}$: Number of MB sub computation blocks within the computation block responsible for processing the current layer.

unit$_k^{MB}$: Number of output units assigned to a MB sub computation block with index k, with $0 \leq k < $ num_MB$_{current}$.

num_HB$_{current}$: Number of HB sub computation blocks within the computation block responsible for processing the current layer.

unit$_k^{HB}$: Number of output units assigned to a HB sub computation block with index k, with $0 \leq k < $ num_HB$_{current}$.

num_FB$_{current}$: Number of FB sub computation blocks within the computation block responsible for processing the current layer.

num_FB$_{next\_layer}$: Number of FB sub computation blocks within the computation block responsible for processing the next layer.

unit$_k^{FB}$: Number of output units assigned to a FB sub computation block with index k, with $0 \leq k < $ num_FB$_{current}$.

Digital Hardware Implementation of LSTM-P Cell

The digital hardware implementation of the LSTM-P, referred to as a LSTM-P computation block, is divided into 2 separate computation sub blocks, a plurality of which can be connected together to form a computation block for an LSTM-P cell. The 2 computation sub blocks implement the LSTM-P cell by dividing the cell into 2 parts and implementing each respectively: one for the LSTM cell (LB) and one for the projection cell (PB). Each computation sub block computes one output unit at a time and a corresponding cell with multiple outputs can be time multiplexed onto the same computation sub block.

Digital Hardware Implementation of LSTM cell (LB)

The digital hardware implementation of an LSTM computation sub block, computing one output unit at a time, is shown in FIG. 1. A block is denoted as LB$_i$, where i is the index of the computation sub blocks in a chain or set of LB computation sub blocks.

It is important to remember that, when each output unit of an LSTM cell is allocated an LB, each such LB block computes one output unit of that LSTM cell. Realistically, an LSTM cell with a certain number of output units will be allocated fewer LBs than the number of output units. In this case the cell's output computation will be temporally multiplexed in parallel over the allocated LBs.

As shown in FIG. 1, for producing an output of the LSTM cell, the weights of each gate of the LSTM are stored in separate memory blocks [118]. For example, the forget gate has its weights stored in [100]. Each of these weight sets only correspond to the appropriate output units assigned to it. Each gate is given its own separate MAC unit [136]. For example, the output gate has [110] as its MAC unit. This allocation allows the MAC operations associated with the 4 gates to be computed in parallel, achieving a speed-up factor of 4x. Also, the input line, multiplexed [104] between a user input [108] and recurrent connection [106], is shared among the 4 MAC units. This input line is a data bus, carrying a flit of the input. Resulting accumulated values are appropriately transformed using hardware implementation of activations [114], after which they are further processed by a series of multiplication [120] and addition operations [122]. The candidate gate's output of the current timestep is stored in a separate memory block [102] and the LSTM cell's final output of the current timestep is stored in a separate memory block [126]. Finally, the output line of [134] memory block is connected to a multiplexer [130] and a registered line [132] to support interfacing with a multiplexer based chain interconnect to support movement of data from this computation sub block to other computation sub blocks [128]. The memory blocks in LB can individually be, but not limited to, SRAM memory, DRAM memory, ROM memory, flash memory, solid state memory and can be either volatile or non volatile. The LB implements the following equations:

$$i_t = \sigma(W_x^i \odot x_t)$$

$$f_t = \alpha(W_x^f \odot x_t)$$

$$o_t = \sigma(W_x^i \odot x_t)$$

$$c_t = (f_t * c_{t-1}) + (i_t * \sigma(W_x^c \odot x_t))$$

$$y_t = o_t * \sigma(c_t)$$

where $x_t$ is the input data at timestep t, $W_x^i$ are the weights of the input gate, $W^f x$ are the weights of the forget gate, $W_x^o$ are the weights of the output gate and $W^c_x$ are the weights of the cell. $\sigma$ is an activation function. $\odot$ refers to a multiplication and accumulation of 2 input vectors.

As shown in FIG. 1, pipeline registers [116] are also optionally introduced along the data path to increase throughput of the computation. A register can be optionally introduced after any of the sub-modules of adders, multiply and accumulate units, multipliers, hardware implementation of activation functions and memory blocks, etc.

As shown in FIG. 1, strategic quantization stages are also optionally introduced along the computation data path of LB. A plurality of quantization [124] and dequantization blocks [112] that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of adders, multiply and accumulate units, multipliers, hardware implementation of activation functions and memory blocks, etc. will change according to the placement and bit widths of plurality of quantization blocks introduced. For example, in FIG. 1, different data path connections have a bit width of 8 [8], 29 [29] and 32 [32].

Modeling Energy Consumption of Digital Hardware Implementation of LSTM Cell (LB)

Power and energy consumption of a computation sub block can be generally divided into 2 categories: 1. static leakage power; and 2. dynamic switching energy. Each of these can further be divided into: 1. scale variant and 2. scale invariant categories.

Static leakage power and dynamic switching energy can be categorised as scale variant if the consumption changes with respect to the number of output units allocated to a computation sub block. For example, the size of a memory block storing weights of a network connection will increase as more output units are time multiplexed onto the same block. Hence, static power of the memory blocks storing weights can be categorized as scale variant. If the overall consumption does not depend on the number of outputs units time multiplexed onto the computation sub block, it can be categorised as scale invariant. For example, a multiply and accumulate sub module dissipates a deterministic amount of static power, invariant to the number of output units time multiplexed onto the computation sub block containing that multiply and accumulate unit.

The scale variant dynamic energy can be modeled by summing up dynamic energy of each individual operation involved in computation of one output unit. The scale invariant portion can be calculated by summing up total energy of operations that do not depend on the degree of time multiplexing of outputs of a cell on a computation sub block. The scale variant static power consumption can be modeled by summing up static power consumption of each scale variant sub module for computation of one output unit. The scale invariant portion can be calculated by summing up static power consumption of sub modules that do not depend on the degree of time multiplexing of outputs of a cell on a computation sub block.

Inactive computation sub blocks can be disconnected from the voltage supply or put in low power mode using Dynamic Voltage and Frequency Scaling. A highly deterministic mapping of the recurrent neural network allows prediction of cycle level data flow behaviour. By turning off computation sub blocks when they are not needed, static power consumption can be decreased. Care should be exercised when applying the principles of DVFS to the memory blocks as they can be potentially volatile in nature and may lead to loss of data.

Dynamic energy consumed by an LSTM computation sub block with index i (LB) with one output unit allocated is defined as $E^d_{i,LB}$. As discussed above, dynamic energy consumption is further divided according to its dependency on allocation (number of output units time multiplexed on to $LB_i$): $E^{d\text{-}sv}_{i,LB}$ as the scale variant portion of $E^d_{i,LB}$ and $E^{d\text{-}siv}_{i,LB}$ as the scale invariant portion. For FIG. 1, they can be calculated as follows:

$$E^{d\text{-}sv}_{i,LB} = 2 \cdot ^{8,8,8} E^{OP}_{2:1\ max} + 4(n_i + n_r) \cdot ^{8,8} E^r_{memory} + 4 \cdot (n_i + n_r) \cdot ^{8,8,29} E^{OP}_{MAC} +$$
$$4 \cdot ^{29,32} E^{OP}_{dq} + 4 \cdot ^{32,32} E^{OP}_{act} + ^{8,8} E^r_{memory} + ^{8,32,32} E^{OP}_{mult} + ^{32,8} E^{OP}_{q} + ^{8,8} E^w_{memory} +$$
$$^{32,32,32} E^{OP}_{mult} + ^{32,,32} E^{OP}_{dq} + ^{32,32,32} E^{OP}_{adder} + ^{32,32} E^{OP}_{act} + ^{32,32,32} E^{OP}_{mult} + ^{32,8} E^{OP}_{q} +$$
$$^{8,8} E^w_{memory} + 14 \cdot ^{32,32} E_{reg} + 2 \cdot ^{8,8} E_{reg} + (n_r/\text{num\_PB}_{current}) \cdot ^{8,8} E^r_{memory}$$

$$E^{d\text{-}siv}_{i,LB} = 2 \cdot (n_r/\text{num\_RB}_{current})^{8,8,8} E^{OP}_{2:1\ max} +$$
$$\sum_{K=1}^{i} \text{unit}^{PB}_k \cdot (n_r/\text{num\_PB}_{current}) \cdot ^{8,8} E^{OP}_{reg}$$

Static power consumption of an LSTM computation sub block with index i ($LB_i$) with one output unit allocated is defined as $P^s_{i,LB}$. As discussed above, static power consumption is further divided according to its dependency on allocation (number of output units time multiplexed on to $LB_i$): $P^{s\text{-}sv}_{i,LB}$ as the scale variant portion of $P^s_{i,LB}$ and $P^{s\text{-}siv}_{i,LB}$ as the scale invariant portion. For FIG. 1, they can be calculated as follows:

$$P^{s\text{-}sv}_{i,LB} = 4 \cdot ^{1\times8} P^s_{memory} \cdot (n_i + n_r) + 2 \cdot ^{1\times8} P^s_{memory} + ^{1\times8} P^s_{memory}$$

$$P^{s\text{-}siv}_{i,LB} = ^{8,8,8} P^s_{2:1\ max} + 4 \cdot ^{8,8,29} P^s_{MAC} + 4 \cdot ^{29,32} P^s_{dq} + 4 \cdot ^{32,32} P^s_{act} +$$
$$^{8,32,32} P^s_{mult} + ^{32,32} P^s_{dq} + ^{32,32,32} P^s_{mult} + ^{32,32,32} P^s_{adder} + ^{32,8} P^s_{q} + ^{32,32} P^s_{act} +$$
$$^{32,32,32} P^s_{mult} + ^{32,8} P^s_{q} + ^{8,8,8} P^s_{2:1\ max} + 14 \cdot ^{32,32} P^s_{reg} + 3 \cdot ^{8,8} P^s_{reg}$$

Total energy consumed by an LSTM computation sub block with index i (LB) can be written as below:

$$E^{N,total}_{i,LB} = N.E^{d\text{-}sv}_{i,LB} + E^{d\text{-}siv}_{i,LB} +$$
$$N.P^{s\text{-}sv}_{i,LB}.\text{latency}_{e2e} + P^{s\text{-}siv}_{i,LB}.\text{latency}^i_{LB}$$

where $\text{latency}_{e2e}$ is the total latency of processing a given input of the recurrent neural network, $\text{latency}^i_{LB}$ is the latency of computation sub block $LB_i$ of processing all time multiplexed outputs allocated to it and N is the total number of output units time multiplexed onto $LB_i$.

Modeling Performance of Digital Hardware Implementation of LSTM Cell (LB)

Latency of an LSTM computation sub block with index i ($LB_i$) for processing one output can be calculated by adding up individual latencies of each operation involved in the computation of one output unit. For the LB computation sub block shown in FIG. 1, assuming latency of 1 for each operation, it can be written as:

$$T_{i,LB} = (n_i + n_r) + 1 + 1 + 1 + 1 + 1 + 1 + 1 + 1$$

It should be noted that the extra cycle of reading data from memory can be easily shadowed by reading a cycle early, before the compute actually starts. Hence, it is not included in the computation above. FIG. 1 introduces pipelining at outputs of some sub modules. The obvious advantage to introducing a register at such sub-modules is that it reduces the longest delay path and helps improve the operational clock frequency. Another advantage is how it can reduce the overall latency of compute when $LB_i$ is allocated N output units. Pipelining allows filling up the data path with computation across multiple of these N units and allows shadowing of the critical (in terms of defining overall throughput) stages of computation of chronologically newer output units behind critical stages of older output units. Hence, latency of a block $LB_i$, with configuration as FIG. 1, labelled as $T^N_{i,LB}$, to finish computation for N outputs units allocated to it can be written as below:

$$T^N_{i,LB} = (n_i + n_r)*N + 1 + 1 + 1 + 1 + 1 + 1 + 1 + 1 + 1$$

Digital Hardware Implementation of the projection Cell (PB)

Figure 2:
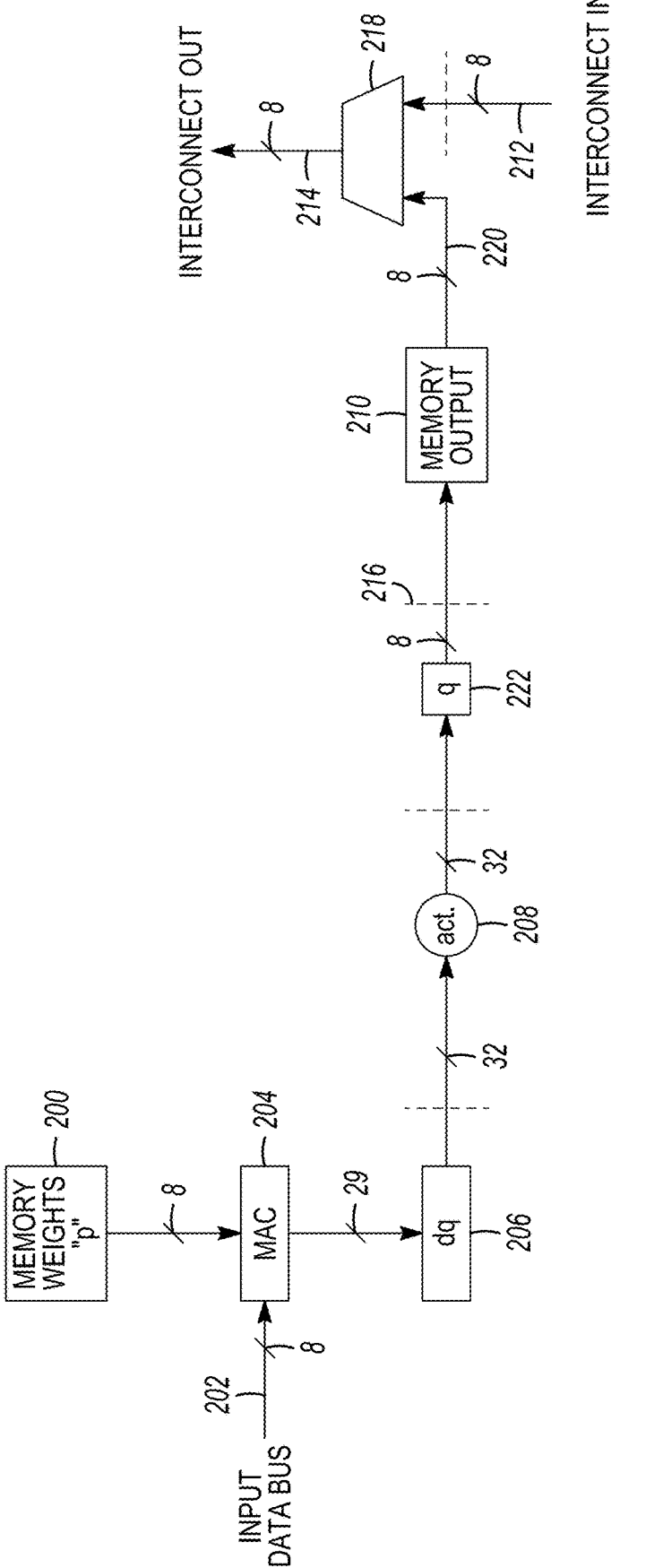
FIG. 2 illustrates a circuit embodiment of a projection cell's computation sub block (PB).

The digital hardware implementation of a projection computation sub block, computing one cell's worth of output, is shown in FIG. 2. Each block is denoted as $PB_i$, where i is the index of the computation sub block in a chain of PB computation sub blocks.

It is important to remember that, when each output unit of a projection cell is allocated a PB, each such PB block computes one output unit of that projection cell. Realistically, a projection cell with a certain number of output units will be allocated fewer PBs than the number of output units. In this case the cell's output computation will be temporally multiplexed in parallel over the allocated PBs.

As shown in FIG. 2, for producing an output of the projected cell, the weights of projection connection are stored in a separate memory block [200]. Each of these weight sets only correspond to the appropriate output units assigned to it. These weights are then subsequently multiplied and accumulated with an input flit from the input data bus [202] using the MAC block [204]. Resulting accumulated values are appropriately transformed using hardware implementation of activations [208]. The output of the current timestep is stored in a separate memory block [210]. Finally, the output line [220] of the output memory block is connected to a multiplexer [218] and a registered line [212] to support interfacing with a multiplexer based chain interconnect to support movement of data from this computation sub block to other computation sub blocks [214]. The memory blocks in PB can individually be, but not limited to, SRAM memory, DRAM memory, ROM memory, flash memory, solid state memory and can be either volatile or non volatile. The PB shown in FIG. 2 implements the following equation:

$$h^P_t = \sigma(W^P_x \odot x_t)$$

where $x_t$ is the input data at timestep t, equal to the output of the corresponding LSTM cell. $W^P_x$ are the weights of the projection connection. $\sigma$ is an activation function. $\odot$ refers to a multiplication and accumulation of 2 input vectors.

As shown in FIG. 2. pipeline registers [216] are also optionally introduced along the data path to increase throughput of the computation. A register can be optionally introduced after any of the sub-module of the multiply and accumulate unit, hardware implementation of activation functions and memory blocks, etc.

As shown in FIG. 2, strategic quantization stages are also optionally introduced along the computation data path of PB. A plurality of quantization [222] and dequantization [206] blocks that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of multiply and accumulate units, hardware implementation of activation functions and memory blocks, etc. will change according to the placement and bit widths of plurality of quantization blocks introduced. For example, in FIG. 2, different data path connections have a bit width of 8 [8], 29 [29] and 32 [32].

Modeling Energy Consumption of Digital Hardware Implementation of Projection Cell (PB)

Similar to the LSTM computation sub block, LB, power and energy consumption of a computation sub block PB can also be divided into 2 categories: 1. static leakage power; and 2. dynamic switching energy and each of these can further be divided into: 1. scale variant; and 2. scale invariant categories introduced previously.

Similar to the LSTM computation sub block, LB, inactive computation sub blocks can be disconnected from the voltage supply or put in low power mode using Dynamic Voltage and Frequency Scaling, as introduced previously.

Dynamic energy consumed by a projection computation sub block with index i ($PB_i$) with one output unit allocated is defined as $E^d_{i,PB}$. As discussed above, dynamic energy consumption is further divided according to its dependency on allocation (number of output units time multiplexed on to $PB_i$): $E^{d-sv}_{i,PB}$ as the scale variant portion of $E^d_{i,PB}$ and $E^{d-siv}_{i,PB}$ as the scale invariant portion. For FIG. 2, assuming forward connection to a LSTM computation sub block, they can be calculated as follows:

$$E^{d-sv}_{i,PB} = n_c \cdot {}^{8,8}E^r_{memory} + n_c \cdot {}^{8,8,29}E^{OP}_{MAC} + {}^{29,32}E^{OP}_{dq} +$$
$$ {}^{32,32}E^{OP}_{act} + {}^{32,8}E^{OP}_q + {}^{8,8}E^w_{memory} + \left(n_c/\text{num\_LB}_{current}\right) \cdot {}^{8,8}E^r_{memory} +$$
$$\left(n_c, {}_{next\_layer}/\text{num\_LB}_{next\_layer}\right)c^{8,8}E^r_{memory} + 2 \cdot {}^{32,32}E^{OP}_{reg} + {}^{8,8}E^{OP}_{reg}$$

$$E^{d-siv}_{i,PB} = 2 \cdot \left(n_c/LB_{current}\right) \cdot {}^{8,8,8}E^{OP}_{2:1\ max} + \sum_{K=1}^{i} \text{unit}^{LB}_k \cdot \left(n_c/LB_{current}\right) \cdot {}^{8,8}E^{OP}_{reg} +$$
$$ 2 \cdot \left(n_c, {}_{next\_layer}/\text{num\_LB}_{next\_layer}\right) \cdot {}^{8,8,8}E^{OP}_{2:1\ max} +$$
$$\sum_{K=1}^{i} \text{unit}_k \cdot \left(n_c, {}_{next\_layer}/\text{num\_LB}_{next\_layer}\right) \cdot {}^{8,8}E^{OP}_{reg}$$

Static power consumption of a projection computation sub block with index i ($PB_i$) with one output unit allocated is defined as $P^s_{i,LB}$. As discussed above, static power consumption is further divided according to its dependency on allocation (number of output units time multiplexed on to $PB_i$): $P^{s-sv}_{i,PB}$ as the scale variant portion of $P^s_{i,PB}$ and $P^{s-siv}_{i,PB}$ as the scale invariant portion. For FIG. 2, they can be calculated as follows:

$$P^{s-sv}_{i,PB} = n_c \cdot {}^{1 \times 8}P_{memory}{}^s + {}^{1 \times 8}P_{memory}{}^s$$

$$P^{s-siv}_{i,PB} = {}^{8,8,29}P_{MAC}{}^s + {}^{29,32}P_{dq}{}^s + {}^{32,32}P_{act}{}^s + {}^{32,8}P_q{}^s + {}^{8,8,8}P_{2:1\ mux}{}^s + 2 \cdot {}^{32,32}P_{reg}{}^s + 2 \cdot {}^{8,8}P_{reg}{}^s$$

Total energy consumed by a projection computation sub block with index i ($PB_i$) can be written as below:

$$E^{N,total}_{i,PB} = N \cdot E^{d-sv}_{i,PB} + E^{d-siv}_{i,PB} + N \cdot P^{s-sv}_{i,PB} \cdot \text{latency}_{e2e} + P^{s-siv}_{i,PB} \cdot \text{latency}^i_{PB}$$

where $\text{latency}_{e2e}$ is the total latency of processing a given input of the recurrent neural network, $\text{latency}^i_{PB}$ is the latency of computation sub block PB of processing all time multiplexed outputs allocated to it and N is the total number of output units time multiplexed onto $PB_i$.

Modeling Performance of Digital Hardware Implementation of projection cell (PB)

Latency of a projection computation sub block with index i ($PB_i$) for processing N outputs, abbreviated as $T^N_{i, PB}$, can be calculated by adding up individual latencies of each operation involved in the computation of N output units. Similar to the LSTM computation sub block, a plurality of pipelining registers can be introduced to reduce the longest delay path and also increase throughput by filling up the data path with computation across multiple of these N units, thus shadowing critical stages of computation of chronologically newer output units behind critical stages of older output units. Hence, latency of a block $PB_i$, with configuration as FIG. 2, labelled at $T^N_{i, PB}$, to finish computation for N output units allocated to it can be written as below:

$$T^N_{i,PB}=(n_r \cdot N)+4$$

Complete Digital Hardware Implementation of LSTM-P Computation Block

Figure 3:
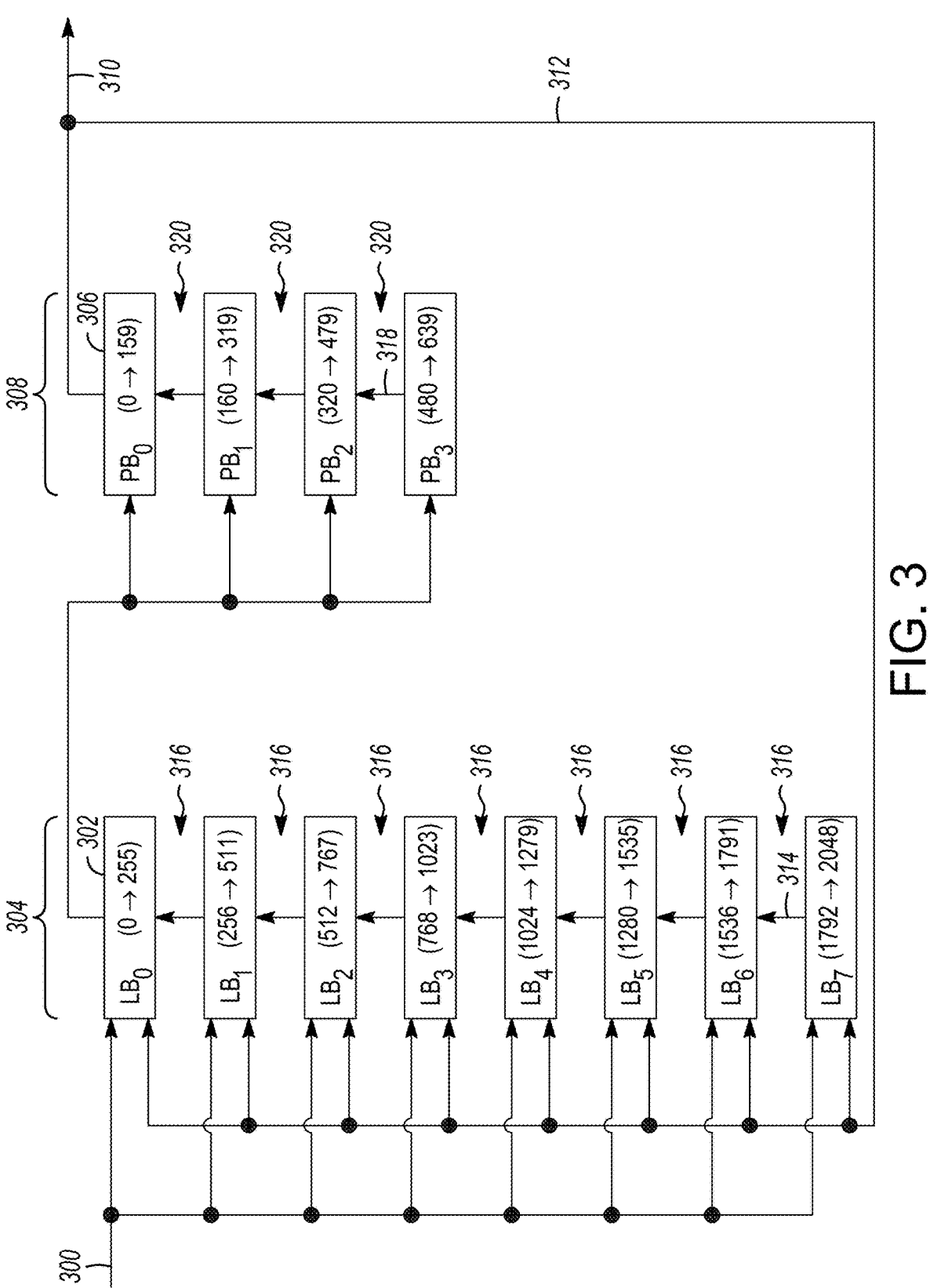
FIG. 3 illustrates a circuit embodiment of a LSTM-P cell's computation block, consisting of multiple LBs and PBs.

A plurality of LSTM computation sub blocks (LBs) can be connected to work in parallel with a plurality of projection computation sub blocks (PBs), with memory output readouts from one set of blocks connected to the input bus of the other set via a chain of multiplexer and registers acting as an interconnect. FIG. 3 shows 8 LBs [304] and 4 PBs [308] connected together to form a LSTM-P computation block, with an LSTM cell with 2049 outputs time multiplexed onto the 8 LBs and a projection cell with 640 outputs time multiplexed onto the 4 PBs. $LB_0$ [302] will be responsible for computation of LSTM cell's outputs 0-255 and $PB_0$ [306] will be responsible for computation of projection cell's outputs 0-159. The input data bus [300] is fed to all 8 LBs at the same time. The streaming multiplexer chain interconnect after each set of LBs [316] and PBs [320] allow data dependencies to be well composed, despite any unbalanced/disjointed resource allocation between the 2 sets of computation sub blocks. For example, the data line [314] will pass LSTM cell's outputs 1792-2048 to the other LSTM computation sub blocks and data line [318] will pass projection cell's outputs 480-639 to other projection computation sub blocks.

All the 8 LBs will finish their MAC operations at the same time. All 8 LBs write their allocated LSTM cells' outputs to 8 different memories (titled "memory output" in FIG. 1). Since each PB needs access to all of the LSTM outputs, each of these 8 different memories are then multiplexed streamed serially onto a single bus via a chain of multiplexer based interconnect [316]. This bus then forms the input to the set of PB blocks.

Due to symmetry of workload distribution, all PBs finish their workload of projected output calculation at the same time. Each of them then writes its computed projected units to its memory (titled "memory output" in FIG. 2). These memories then become the input to the next LSTM cell [310] for the current timestep and input to the same LSTM cell for the next timestep [312]. Hence, they are again multiplexed streamed via a chain of mux based bus [320] to form the final data bus to the next computation block (not shown) as well as the set of LB computation sub blocks in FIG. 3.

Total energy consumption of the LSTM-P computation block can be calculated by summing up individual energy consumption of its constituent set of LSTM computation sub blocks LB and its constituent projection computation sub blocks PB.

For calculating the latency and throughput of a LSTM-P computation block, the parallel mode of operation plays an important role. All constituent sub blocks in the set of constituent LSTM computation sub blocks work in parallel. Hence, the slowest LB sub block in finishing the computation of its allocated output units of the LSTM cell determines the latency of the entire set of constituent LSTM sub blocks. Similarly, the slowest PB sub block in finishing the computation of its allocated output units of the projection cell determines the latency of the entire set of constituent projection sub blocks. Hence, to calculate the overall latency of an LSTM-P computation block, the latency of the set of constituent LSTM sub blocks can be added with the latency of the set of constituent projection sub blocks. The throughput of the LSTM-P computation block is determined by the slowest computation sub block, regardless of type.

Digital Hardware Implementation of LMU Cell

Digital Hardware implementation of LMU is divided into 3 separate computation sub blocks, a plurality of which can be connected together to form a computation block for an LMU cell. The 3 computation sub blocks implement the LMU cell by dividing the cell into 3 parts and implementing each respectively: one for the encoder cell (UB), one for the memory cell (MB) and one for the hidden cell (HB). Each computation sub block computes one output unit at a time and a corresponding cell with multiple outputs can be time multiplexed onto the same computation sub block.

Digital Hardware Implementation of encoder cell (UB)

Figure 4:
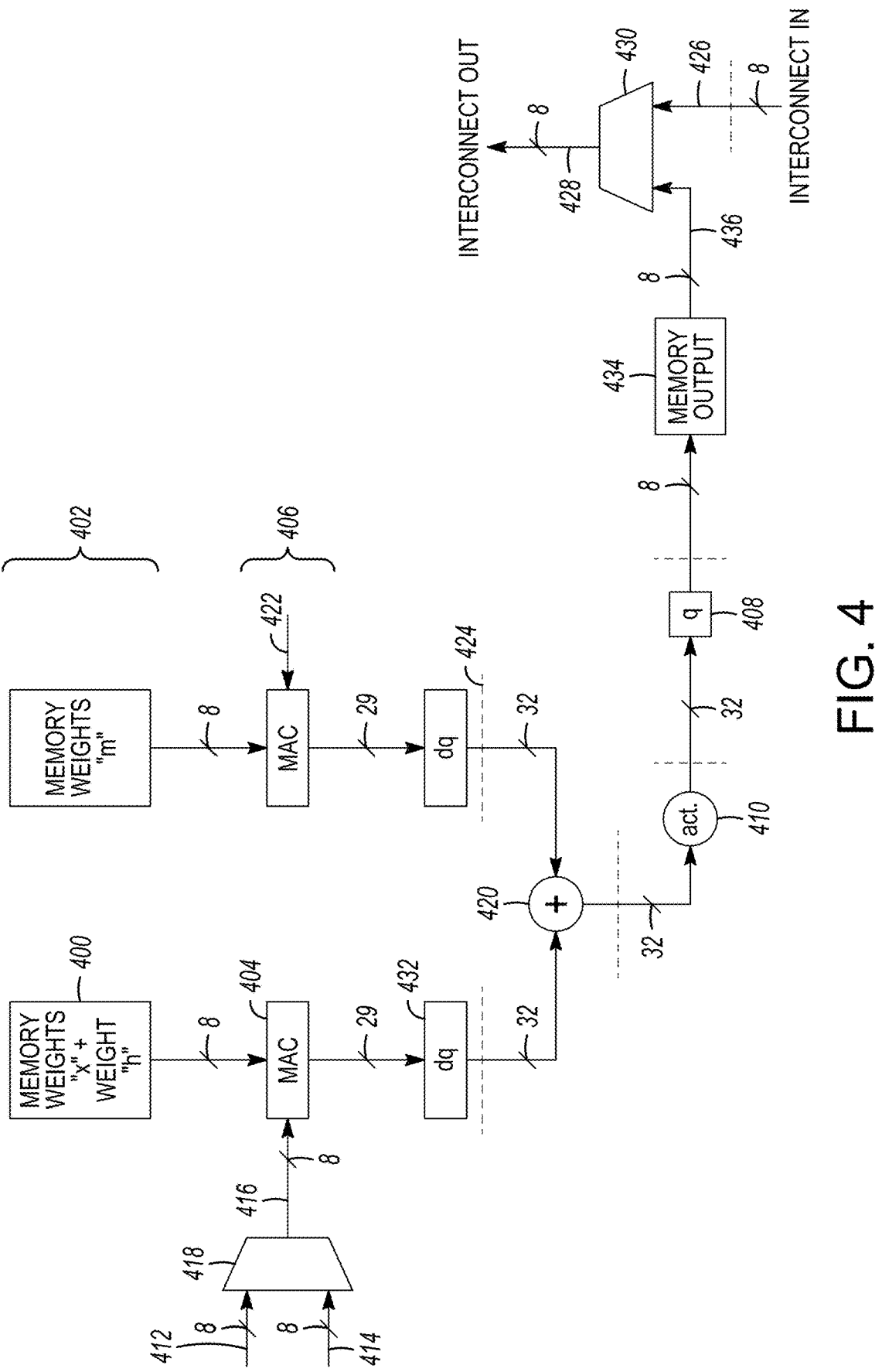
FIG. 4 illustrates a circuit embodiment of an encoder cell's computation sub block (UB).

The digital hardware implementation of an encoder computation sub block, computing one output unit at a time, is shown in FIG. 4. A block is denoted as $UB_i$, where i is the index of the computation sub blocks in a chain of UB computation sub blocks.

Similar to the LSTM-P's computation sub block, the encoder cell's output computation will be temporally multiplexed in parallel over the allocated UBs.

It is important to note that the input vector to the encoder cells, the hidden state and memory can all be potentially of different sizes, thus the MAC operations associated with each of them can potentially finish at different times, thus resulting in one of them taking the longest. This will become the bottleneck in computation latency. Triangular inequality law, that checks if the sum of two numbers is less than the third number, can be deployed to check if two multiply and accumulate operations can be sequentialized to save static power dissipation and silicon area of the resulting hardware implementation.

As shown in FIG. 4, for computing an output of the encoder cell, the weights are stored in memory blocks [402], with each connection composed of its own memory block like [400]. Each of these weights sets only correspond to the appropriate output units assigned to it. These weights are then subsequently multiplied and accumulated with an input flit from the input data bus [416], multiplexed [418] between inputs [412] and [414], and input data bus [422], using MAC blocks [406] like [404]. Triangular inequality law has been used here to fold the input and hidden states' related multiply and accumulate operations onto the same MAC unit, thus also storing the corresponding weights onto the same physical memory block. Resulting accumulated values are added [420] and optionally transformed using hardware implementation of activations [410] and finally written to the output memory block [434]. Finally, the output line [436] of the output memory block is connected to a multiplexer [430] and a registered line [426] to support interfacing with a multiplexer based chain interconnect to support movement of data from this computation sub block to other computation sub blocks [428]. The memory blocks in UB can individually be, but not limited to, SRAM memory, DRAM memory, ROM memory, flash memory, solid state memory and can be either volatile or non volatile. The UB shown in FIG. 4 implements the following equation:

$$u_t = \sigma(e^x \odot x_t + e^h \odot h_{t-1} + e^m \odot m_{t-1})$$

where $x_t$ is the input data at timestep t, $h_{t-1}$ is the hidden state at timestep t–1, $m_t$ is the memory of one of the LMU tapes at timestep t–1 with $e^x$, $e^h$ and $e^m$ being the corresponding weights. $\alpha$ is an activation function. $\odot$ refers to a multiplication and accumulation of 2 input vectors.

As shown in FIG. 4, pipeline registers [424] are also optionally introduced along the data path to increase throughput of the computation. A register can be optionally introduced after any of the sub-modules of adders, multiply and accumulate units, hardware implementation of activation functions and memory blocks, etc.

As shown in FIG. 4, strategic quantization stages are also optionally introduced along the computation data path of UB. A plurality of quantization [408] and dequantization [432] blocks that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of adders, multiply and accumulate units, hardware implementation of activation functions and memory blocks, etc. will change according to the placement and bit widths of plurality of quantization blocks introduced. For example, in FIG. 4, different data path connections have a bit width of 8 [8], 29 [29] and 32 [32].

Modeling Energy Consumption of Digital Hardware Implementation of Encoder Cell (UB)

Similar to computation sub blocks of the LSTM-P, power and energy consumption of a computation sub block UB can also be divided into 2 categories: 1. static leakage power; and 2. dynamic switching energy and each of these can further be divided into: 1. scale variant; and 2. scale invariant categories introduced previously.

Similar to the computation sub blocks of the LSTM-P, inactive computation sub blocks can be disconnected from the voltage supply or put in low power mode using Dynamic Voltage and Frequency Scaling, as introduced previously.

Dynamic energy consumed by an encoder computation sub block with index i ($UB_i$) with one output unit allocated is defined as $E^d_{i,UB}$. As discussed above, dynamic energy consumption is further divided according to its dependency on allocation (number of output units time multiplexed on to $UB_i$): $E^{d-sv}_{i,UB}$ as the scale variant portion of $E^d_{i,UB}$ and $E^{d-siv}_{i,UB}$ as the scale invariant portion. For FIG. 4, assuming a single memory tape, they can be calculated as follows:

$$E^d_{i,UB} = 2.^{8,8,8}E_{2:1\ mux} + (n_c+n_i+n_r).^{8,8}E_{memory}^r + (n_c+n_i+n_r).^{8,8,29}E_{MAC}^{OP} + 2.^{29,32}E_{dq}^{OP} + ^{32,32,32}E_{adder}^{OP} + ^{32,32}E_{act}^{OP} + ^{32,8}E_{q}^{OP} + (n_r/num\_MB_{current}).^{8,8}E_{memory}^r + 4.^{32,32}E_{reg}^{OP} + ^{8,8}E_{reg}^{OP}$$

Static power consumption of an encoder computation sub block with index i ($UB_i$) with one output unit allocated is defined as $P^s_{i,UB}$. As discussed above, static power consumption is further divided according to its dependency on allocation (number of output units time multiplexed on to $UB_i$): $P^{s-sv}_{i,UB}$ as the scale variant portion of $P^s_{i,UB}$ and $P^{s-siv}_{i,UB}$ as the scale invariant portion. For FIG. 4, assuming a single memory tape, they can be calculated as follows:

$$P^s_{i,UB} = ^{8,8,8}P_{2:1\ mux}^s + (n_i+n_c+n_r).^{1\times8}P_{memory}^s + 2.^{8,8,29}P_{MAC}^s + 2.^{29,32}P_{dq}^s + ^{32,32,32}P_{adder}^s + ^{32,32}P_{act}^s + ^{32,8}P_{q}^s + ^{1\times8}P_{memory}^s + ^{8,8,8}P_{2:1\ mux}^s + 4.^{32,32}P_{reg}^s + 2.^{8,8}P_{reg}^s$$

Total energy consumed by an encoder computation sub block with index i ($UB_i$) can be written as below:

$$E^{N,total}_{i,UB} = N.E^{d-sv}_{i,UB} + E^{d-siv}_{i,UB} + N.P^{s-sv}_{i,UB}.latency_{e2e} + P^{s-siv}_{i,UB}.latency^i_{UB}$$

where $latency_{e2e}$ is the total latency of processing a given input of the recurrent neural network, $latency^i_{UB}$ is the latency of computation sub block $UB_i$ of processing all time multiplexed outputs allocated to it and N is the total number of output units time multiplexed onto $UB_i$.

Modeling Performance of Digital Hardware Implementation of Encoder Cell (UB)

Latency of an encoder computation sub block with index i ($UB_i$) for processing N outputs, abbreviated as $T^N_{i,\ UB}$, can be calculated by adding up individual latencies of each operation involved in the computation of N output units. Similar to the LSTM-P computation sub blocks, a plurality of pipelining registers can be introduced to reduce the longest delay path and also increase throughput by filling up the data path with computation across multiple of these N units, thus shadowing critical stages of computation of chronologically newer output units behind critical stages of older output units. For the UB computation sub block shown in FIG. 4, assuming latency of 1 for each operation, it can be written as:

$$T^N_{i,UB} = \{(n_c.N)+5, \text{ if } n_c \geq n_i+n_r$$

$$(n_r.N)+5, \text{ if } n_r \geq n_i+n_c$$

$$(n_i.N)+5, \text{ if } n_i \geq n_c+n_r$$

Digital Hardware Implementation of the memory cell (MB)

Figure 5:
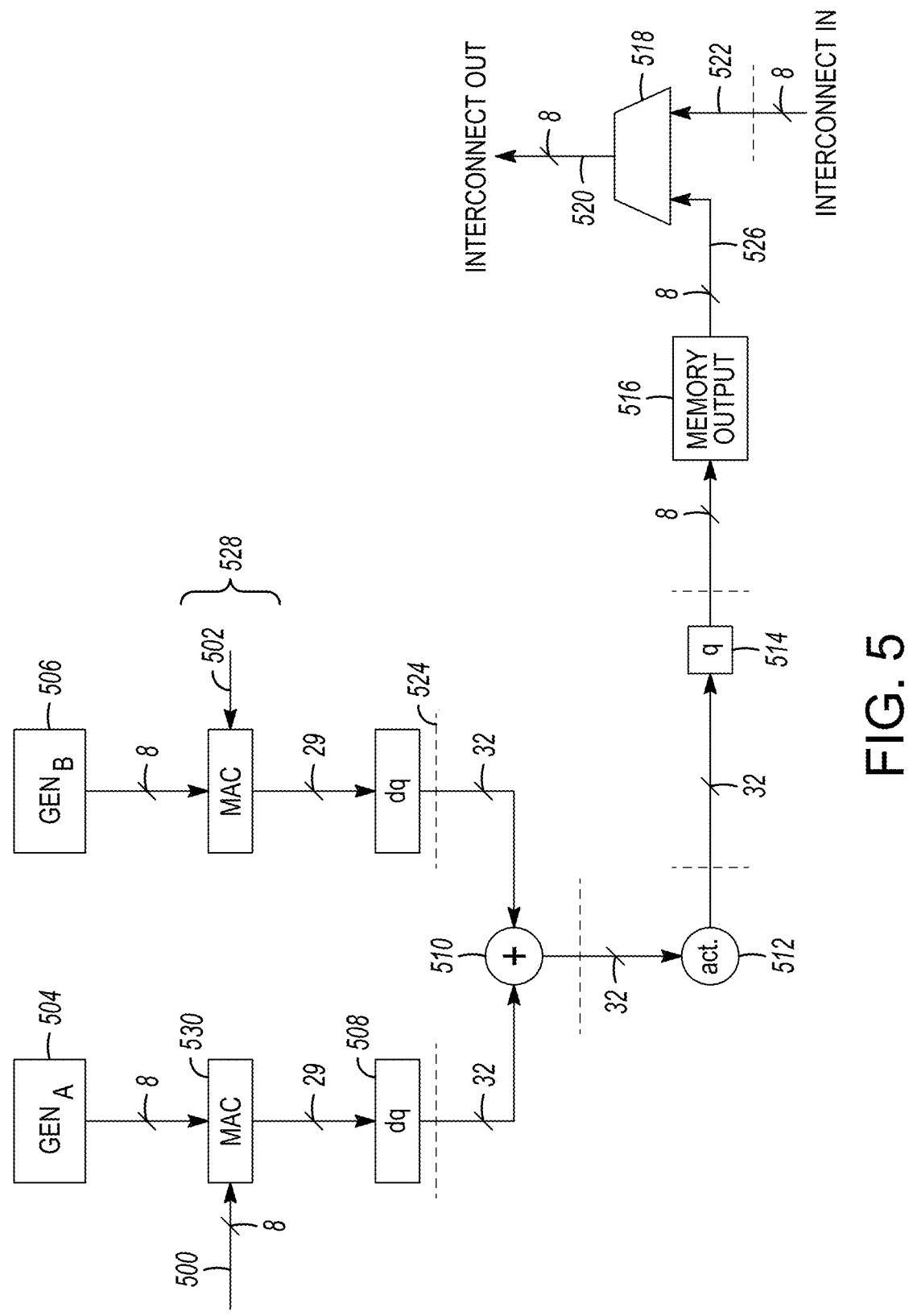
FIG. 5 illustrates a circuit embodiment of a memory cell's computation sub block (MB).

The digital hardware implementation of a memory computation sub block, computing one unit of memory output, is shown in FIG. 5. Each block is denoted as $MB_i$, where i is the index of the computation sub blocks in a chain of MB computation sub blocks.

Similar to computation sub blocks introduced before, the cell's output computation will be temporally multiplexed in parallel over the allocated MBs.

Figure 6:
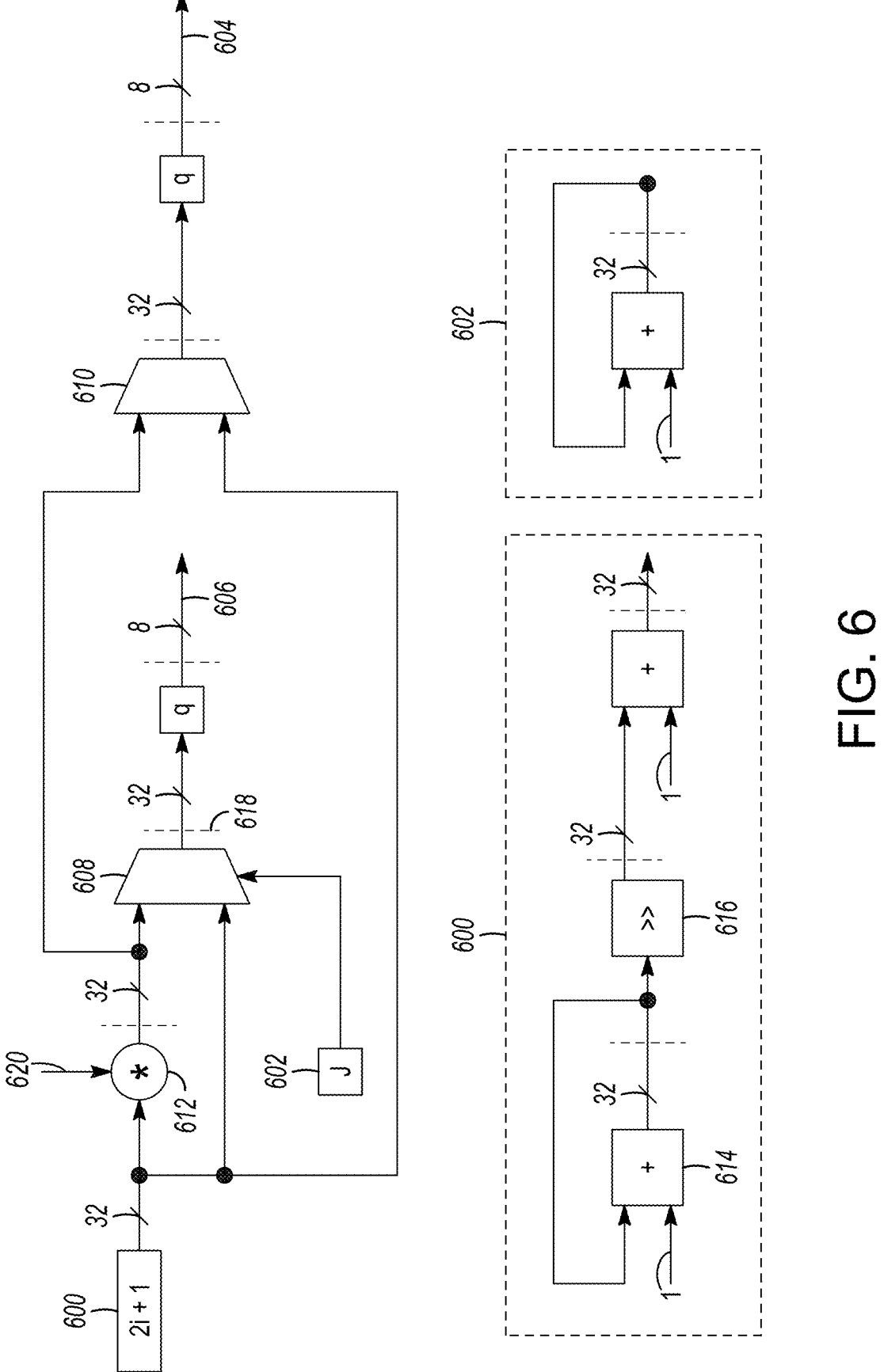
FIG. 6 illustrates a circuit embodiment of $\text{Gen}_A$ and $\text{Gen}_B$ for generating weights A and B of the LMU.

As shown in FIG. 5, for producing an output of the memory cell, the weights A and B of the memory cell can be generated in real time using $Gen_A$ [504] and $Gen_B$ [506] respectively. As shown in FIG. 6, with $Gen_A$ implementing the following equation with output line [606]:

$$A = a_{ij} \in R^{q \times q}, \text{ where } a_{ij} = (2*i+1)*\{-1, \text{ if } i<j$$

$$(-1)^{i-j+1} \text{ if } i \geq j$$

where q is a property of the LMU cell, i and j are greater than equal to zero, and $Gen_B$ implementing the following equation with output line [604] in FIG. 6:

$$B = b_i \in R^{q \times 1}, \text{ where } b_i = (2*i+1)*(-1)^i$$

where q is a property of the LMU cell, i is greater than equal to zero.

The "2*i+1" is implemented by [600] in FIG. 6, by the use of an incrementing adder [614], with 1 [1] as one of its operands, with its output being shifted to the left by one bit using a left shift operation [616] and consequently being incremented. The "j" part of the equation is implemented in [602]. The output of [600] is then multiplied [612] with –1 on line [620] before being processed by a multiplexer [608] using [602] as a select line and pipelined [618] to generate the outputs of $Gen_A$ in [606]. The output of the multiplier [612] and block [600] are also used for $Gen_B$, which are multiplexed via [610] to generate the outputs of $Gen_B$ in [604]. The bit widths of other sub modules of adders, bit shifters, multipliers, multiplexers etc. will change according to the placement and bit widths of plurality of quantization blocks introduced. For example, in FIG. 6, different data path connections have a bit width of 8 [8], 29 [29] and 32 [32].

Optionally, the weights A and B can also be stored in memory instead. Each of these weight sets only correspond to the appropriate output units assigned to it. These weights are then subsequently multiplied and accumulated with an input flit, typically memory of particular memory tape, from the input data buses [500] and [502] using the MAC blocks [528] like [530]. The 2 values are added up [510] and the values are appropriately transformed using hardware implementation of activations [512] and finally written to an output memory block [516]. Finally, the output line [526] of the output memory block is connected to a multiplexer [518] and a registered line [522] to support interfacing with a multiplexer based chain interconnect to support movement of data from this computation sub block to other computation sub blocks [520]. The memory blocks in LB can individually be, but not limited to, SRAM memory, DRAM memory, ROM memory, flash memory, solid state memory and can be either volatile or non volatile. The MB shown in FIG. 5 implements the following equation:

$$m_t = \sigma(A \odot m_{t-1} + B * u_t)$$

where $m_{t-1}$ is the memory of a memory tape at timestep $t-1$ and $u_t$ is the encoded input of that memory tape with A and B being the weights of the memory cell. o is an activation function. $\odot$ refers to a multiplication and accumulation of 2 input vectors.

As shown in FIG. 5, pipeline registers [524] are also optionally introduced along the data path to increase throughput of the computation. A register can be optionally introduced after any of the sub-module of the multiply and accumulate unit, hardware implementation of activation functions and memory blocks, etc.

As shown in FIG. 5, strategic quantization stages are also optionally introduced along the computation data path of MB. A plurality of quantization [514] and dequantization [508] blocks that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of multiply and accumulate unit, hardware implementation of activation functions and memory blocks, etc. will change according to the placement and bit widths of plurality of quantization blocks introduced. For example, in FIG. 5, different data path connections have a bit width of 8 [8], 29 [29] and 32 [32].

Modeling Energy Consumption of Digital Hardware Implementation of Memory Cell (MB)

Similar to the previously introduced computation sub blocks, power and energy consumption of a computation sub block MB can also be divided into 2 categories: 1. static leakage power; and 2. dynamic switching energy and each of these can further be divided into: 1. scale variant; and 2. scale invariant categories introduced previously.

Similar to previously introduced computation sub blocks inactive computation sub blocks can be disconnected from the voltage supply or put in low power mode using Dynamic Voltage and Frequency Scaling, as introduced previously.

Dynamic energy consumed by a projection computation sub block with index i ($MB_i$) with one output unit allocated is defined as $E^d_{i,MB}$. As discussed above, dynamic energy consumption is further divided according to its dependency on allocation (number of output units time multiplexed on to $MB_i$): $E^{d-sv}_{i,MB}$ as the scale variant portion of $E^d_{i,MB}$ and $E^{d-siv}_{i,MB}$ as the scale invariant portion. For FIG. 5, assuming a single memory tape, they can be calculated as follows:

$$E^{d-sv}_{i,MB} =$$

$$n_c \cdot^8 E^{OP}_{GEN-A} + {}^8 E^{OP}_{GEN-B} + (n_c + 1) \cdot^{8,8,29} E^{OP}_{MAC} + 2 \cdot^{29,32} E^{OP}_{dq} + {}^{32,32,32} E^{OP}_{adder} +$$

$$^{32,32} E^{OP}_{act} + {}^{32,8} E^{OP}_{q} + {}^{8,8} E^{w}_{memory} + (n_c / num\_MB_{current}) \cdot^{8,8} E^{r}_{memory} +$$

$$(n_r / num\_HB_{current}) \cdot^{8,8} E^{r}_{memory} + {}^{8,8} E^{r}_{memory} + 4 \cdot^{32,32} E^{OP}_{reg} + {}^{8,8} E^{OP}_{reg}$$

$$E^{d-siv}_{i,MB} = 2 \cdot^{8,8,8} E^{OP}_{2:1\ max} + \sum_{K=1}^{i} unit_k^{MB} \cdot^{8,8} E^{OP}_{reg} +$$

$$(n_c / num\_MB_{current}) \cdot \left( 2 \cdot^{8,8,8} E^{OP}_{2:1\ max} + \sum_{K=1}^{i} unit_k^{MB} \cdot^{8,8} E^{OP}_{reg} \right) +$$

$$(n_r / num\_HB_{current}) \cdot \left( 2 \cdot^{8,8,8} E^{OP}_{2:1\ max} + \sum_{K=1}^{i} unit_k^{MB} \cdot^{8,8} E^{OP}_{reg} \right)$$

Static power consumption of a memory computation sub block with index i ($MB_i$) with one output unit allocated is defined as $P^s_{i,MB}$. As discussed above, static power consumption is further divided according to its dependency on allocation (number of output units time multiplexed on to $MB_i$): $P^{s-sv}_{i,MB}$ as the scale variant portion of $P^s_{i,MB}$ and $P^{s-siv}_{i,MB}$ as the scale invariant portion. For FIG. 5, they can be calculated as follows:

$$P^{s-sv}_{i,MB} = 2 \cdot^{1 \times 8} P_{memory}{}^s$$

$$P^{s-siv}_{i,MB} = {}^8 P_{GEN-A}{}^s + {}^8 P_{GEN-B}{}^s + 2 \cdot^{8,8,29} P_{MAC}{}^s + 2 \cdot^{29,32} P_{dq}{}^s + {}^{32,32,32} P_{adder}{}^s + {}^{32,32} P_{act}{}^s + {}^{32,8} P_q{}^s + {}^{8,8,8} P_{2:1\ mux}{}^s + 4 \cdot^{32,32} P_{reg}{}^s + 2 \cdot^{8,8} P_{reg}{}^s$$

Total energy consumed by a memory computation sub block with index i (MB) can be written as below:

$$E^{N,total}_{i,MB} = N \cdot E^{d-sv}_{i,MB} + E^{d-siv}_{i,MB} + N \cdot P^{s-sv}_{i,MB} \cdot latency_{e2e} + P^{s-siv}_{i,MB} \cdot latency^i_{MB}$$

where $latency_{e2e}$ is the total latency of processing a given input of the recurrent neural network, $latency^i_{MB}$ is the latency of computation sub block $MB_i$ of processing all time multiplexed outputs allocated to it and N is the total number of output units time multiplexed onto $MB_i$.

Modeling Performance of Digital Hardware Implementation of memory cell (MB)

Latency of a memory computation sub block with index i ($MB_i$) for processing N outputs, abbreviated as $T^N_{i,\ MB}$, can be calculated by adding up individual latencies of each operation involved in the computation of N output units. Similar to computation sub blocks introduced previously, a plurality of pipelining registers can be introduced to reduce the longest delay path and also increase throughput by filling up the data path with computation across multiple of these N units, thus shadowing critical stages of computation of chronologically newer output units behind critical stages of older output units. For the MB computation sub block shown in FIG. 5, assuming latency of 1 for each operation, it can be written as:

$$T^N_{i,MB} = (n_c \cdot N) + 5$$

Digital Hardware Implementation of the Hidden Cell (HB)

Figure 7:
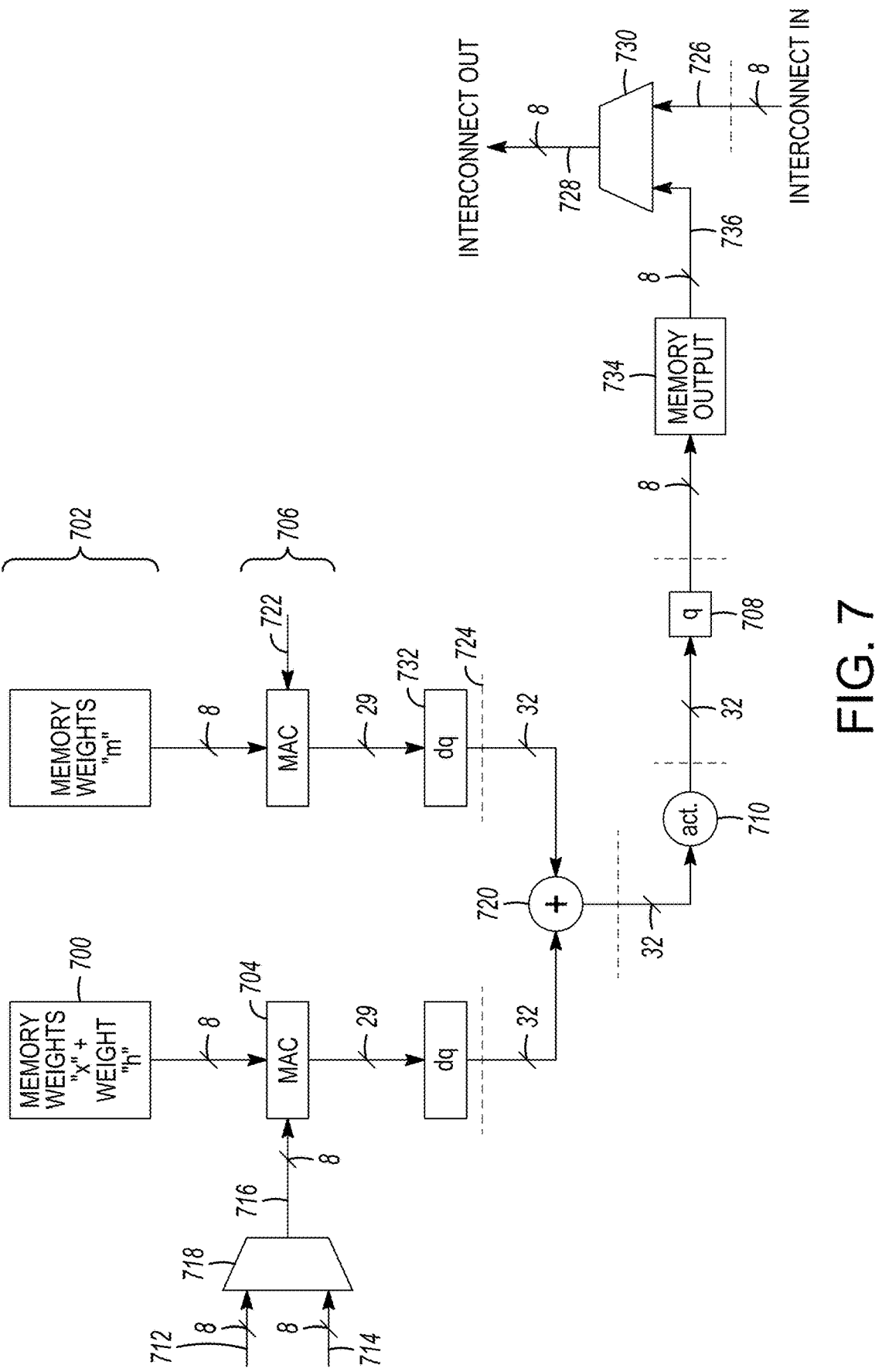
FIG. 7 illustrates a circuit embodiment of a hidden cell's computation sub block (HB).

The digital hardware implementation of a hidden computation sub block, computing one unit of hidden cell output, is shown in FIG. 7. Each block is denoted as $HB_i$, where i is the index of the computation sub blocks in a chain of HB computation sub blocks.

Similar to computation sub blocks introduced before, the cell's output computation will be temporally multiplexed in parallel over the allocated HBs.

As shown in FIG. 7, for producing an output of the hidden cell, the set of weights are stored in memory blocks [702], with each connection composed of its own memory block like [700]. Each of these weight sets only correspond to the appropriate output units assigned to it. These weights are then subsequently multiplied and accumulated with input flits from the input data bus [716], multiplexed [718] between [712] and [714], and input bus [722], using the group of MAC blocks [706], with [704] being one of the MAC blocks in the group. Triangular inequality law has been used here to fold the input and hidden states' related multiply and accumulate operations onto the same MAC unit, thus also storing the corresponding weights onto the same physical memory block. Resulting accumulated values are added up [720] before being optionally transformed using hardware implementation of activation [710] and then written to output memory block [734]. Finally, the output line [736] of the output memory memory block is connected to a multiplexer [730] and a registered line [726] to support interfacing with a multiplexer based chain interconnect to support movement of data from this computation sub block to other computation sub blocks [728]. The memory blocks in HB can individually be, but not limited to, SRAM memory, DRAM memory, ROM memory, flash memory, solid state memory and can be either volatile or non volatile. The HB shown in FIG. 7 implements the following equation:

$$h_t = \sigma(W_x \odot x_t + W_h \odot h_{t-1} + W_m \odot m_t)$$

where $x_t$ is input at timestep t, $h_{t-1}$ is the hidden state at timestep t−1, $m_t$ is the entire flattened memory tape at timestep t with $W_x$, $W_h$ and $W_m$ being the weights respectively. $\sigma$ is an activation function. $\odot$ refers to a multiplication and accumulation of 2 input vectors.

As shown in FIG. 7, pipeline registers [724] are also optionally introduced along the data path to increase throughput of the computation. A register can be optionally introduced after any of the sub-module of the multiply and accumulate unit, adder, hardware implementation of activation functions and memory blocks, etc.

As shown in FIG. 7, strategic quantization stages are also optionally introduced along the computation data path of HB. A plurality of quantization [708] and dequantization [732] blocks that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of multiply and accumulate unit, adder, hardware implementation of activation functions and memory blocks, etc. will change according to the placement and bit widths of plurality of quantization blocks introduced. For example, in FIG. 7, different data path connections have a bit width of 8 [8], 29 [29] and 32 [32].

Modeling Energy Consumption of Digital Hardware Implementation of Hidden Cell (HB)

Similar to the previously introduced computation sub blocks, power and energy consumption of a computation sub block HB can also be divided into 2 categories: 1. static leakage power; and 2. dynamic switching energy and each of these can further be divided into: 1. scale variant; and 2. scale invariant categories introduced previously.

Similar to previously introduced computation sub blocks inactive computation sub blocks can be disconnected from the voltage supply or put in low power mode using Dynamic Voltage and Frequency Scaling, as introduced previously.

Dynamic energy consumed by a projection computation sub block with index i ($HB_i$) with one output unit allocated is defined as $E^d_{i,HB}$. As discussed above, dynamic energy consumption is further divided according to its dependency on allocation (number of output units time multiplexed on to $HB_i$): $E^{d-sv}_{i,HB}$ as the scale variant portion of $E^d_{i,HB}$ and $E^{d-siv}_{i,HB}$ as the scale invariant portion. For FIG. 7, assuming forward connection to an LMU layer with a single memory tape, they can be calculated as follows:

$$E^{d-sv}_{i,HB} = 2 \cdot^{8,8,8} E^{OP}_{2:1\ max} + (n_i + n_r + n_c) \cdot^{8,8,29} E^{OP}_{MAC} +$$
$$(n_i + n_r + n_c)^{8,8} E^r_{memory} + 2 \cdot^{29,32} E^{OP}_{dq} + {}^{32,32,32} E^{OP}_{adder} + {}^{32,32} E^{OP}_{act} +$$
$$^{32,8} E^{OP}_q + {}^{8,8} E^w_{memory} + \left(n_r/\text{num\_HB}_{current}\right) \cdot E^r_{memory} + E^r_{memory} + E^r_{memory}$$
$$E^{d-siv}_{i,HB} = 2 \cdot^{8,8,8} E^{OP}_{2:1\ max} + \sum_{K=1}^{i} \text{unit}_k^{HB} \cdot^{8,8} E^{OP}_{reg} +$$
$$2 \cdot^{8,8,8} E^{OP}_{2:1\ max} + \sum_{K=1}^{i} \text{unit}_k^{HB} \cdot^{8,8} E^{OP}_{reg} +$$
$$\left(n_r/\text{num\_HB}_{current}\right) \cdot \left(2 \cdot^{8,8,8} E^{OP}_{2:1\ max} + \sum_{K=1}^{i} \text{unit}_k^{HB} \cdot^{8,8} E^{OP}_{reg}\right)$$

Static power consumption of a hidden computation sub block with index i ($HB_i$) with one output unit allocated is defined as $P^s_{i,HB}$. As discussed above, static power consumption is further divided according to its dependency on allocation (number of output units time multiplexed on to $HB_i$): $P^{s-sv}_{i,HB}$ as the scale variant portion of $P^s_{i,HB}$ and $P^s_{i,HB}$ and $P^{s-siv}_{i,HB}$ as the scale invariant portion. For FIG. 7, they can be calculated as follows:

$$P^{s-sv}_{i,HB} = (n_i + n_r + n_c) \cdot^{1\times8} P_{memory}^s + 2 \cdot^{1\times8} P_{memory}^s$$

$$P^{s-siv}_{i,HB} = {}^{8,8,8} P_{2:1\ mux}^s + 2 \cdot^{8,8,29} P_{MAC}^s + 2 \cdot^{29,32}$$
$$P_{dq}^s + {}^{32,32,32} P_{adder}^s + {}^{32,32} P_{act}^s + {}^{32,8} P_d^s + {}^{8,8,8}$$
$$P_{2:1\ mux}^s + 4 \cdot^{32,32} P_{reg}^s + 2 \cdot^{8,8} P_{reg}^s$$

Total energy consumed by a memory computation sub block with index i ($HB_i$) can be written as below:

$$E^{N,total}_{i,HB} = N.E^{d-sv}_{i,HB} + E^{d-siv}_{i,HB} + N.$$
$$P^{s-sv}_{i,HB}.\text{latency}_{e2e} + P^{s-siv}_{i,HB}.\text{latency}^i_{HB}$$

where $\text{latency}_{e2e}$ is the total latency of processing a given input of the recurrent neural network, $\text{latency}^i_{HB}$ is the latency of computation sub block $HB_i$ of processing all time multiplexed outputs allocated to it and N is the total number of output units time multiplexed onto $HB_i$.

Modeling Performance of Digital Hardware Implementation of Hidden Cell (HB)

Latency of a hidden computation sub block with index i ($HB_i$) for processing N outputs, abbreviated as $T^N_{i,HB}$, can be calculated by adding up individual latencies of each operation involved in the computation of N output units. Similar to computation sub blocks introduced previously, a plurality of pipelining registers can be introduced to reduce the longest delay path and also increase throughput by filling up the data path with computation across multiple of these N units, thus shadowing critical stages of computation of chronologically newer output units behind critical stages of older output units. For the HB computation sub block shown in FIG. 7, assuming latency of 1 for each operation, it can be written as:

$$T^N_{i,HB} = (n_c.N) + 5, \text{ if } n_c \geq n_r + n_i$$

$$(n_r.N) + 5, \text{ if } n_r \geq n_r + n_c$$

$$(n_i.N) + 5, \text{ if } n_i \geq n_r + n_c$$

Complete Digital Hardware Implementation of LMU Computation Block

Figure 8:
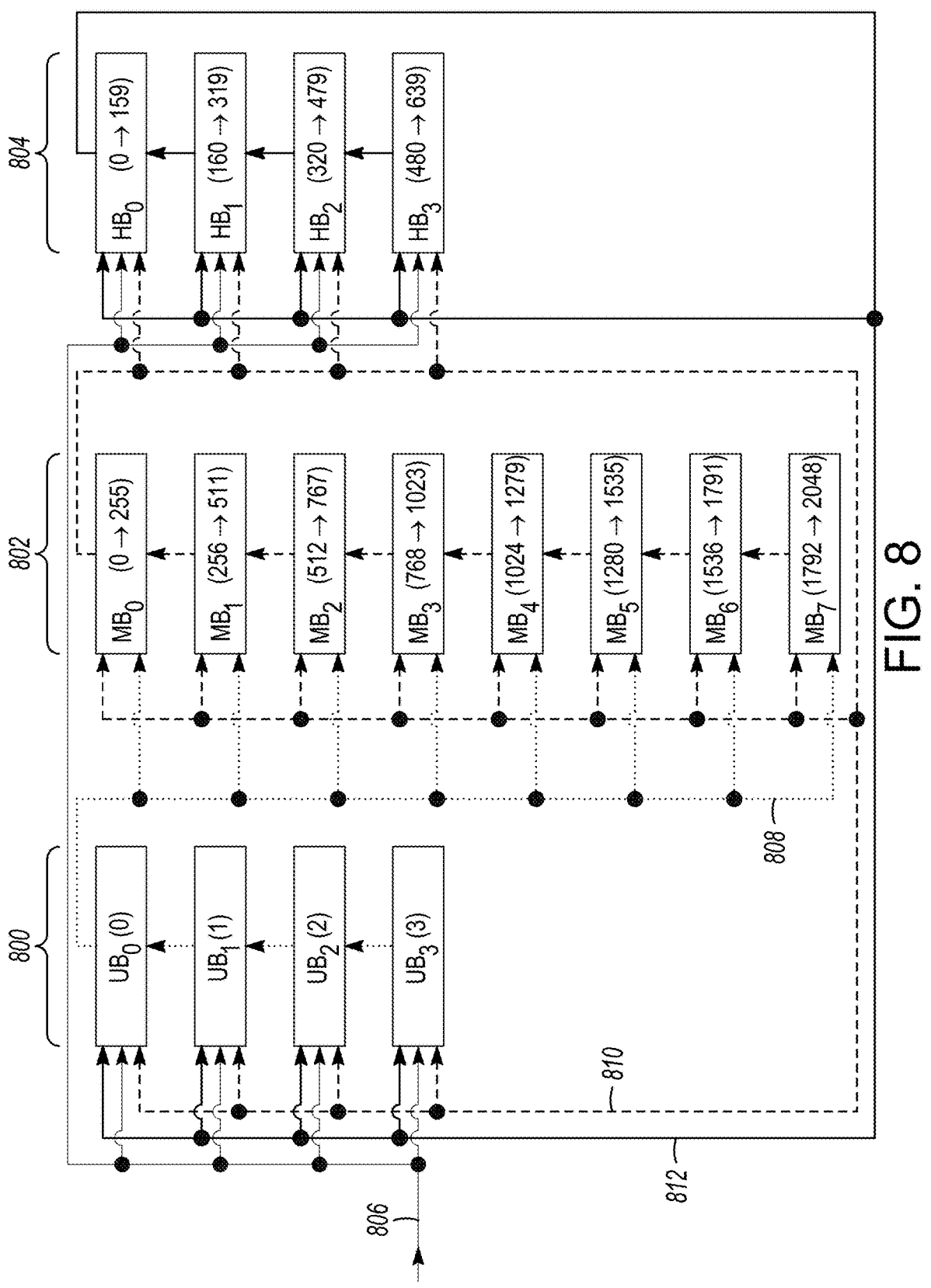
FIG. 8 illustrates a circuit embodiment of a LMU cell's computation block, consisting of multiple UBs, MBs and HBs.

A plurality of encoder computation sub blocks (UBs) can be connected to work in parallel with a plurality of memory computation sub blocks (MBs) which in turn can be connected to work in parallel with a plurality of hidden computation sub blocks (HBs), with memory output readouts from one set of blocks connected to the input bus of the other set via a chain of multiplexer and registers acting as an interconnect. FIG. 8 shows an input bus [806], 4 UBs [800], 8 MBs [802] and 4 HBs [804] connected together to form a computation block, with an encoder cell with 4 outputs time multiplexed onto the 4 UBs, a memory cell with 2048 outputs time multiplexed onto the 8 MBs and a hidden cell with 640 outputs time multiplexed onto the 4 HBs. The input data bus is fed to all 4 UBs and all 4 HBs. The streaming multiplexer chain interconnects after each set of UBs, MBs and HBs allow data dependencies to be well composed, despite any unbalanced/disjointed resource allocation between the 3 sets of computation sub blocks.

All the 4 UBs will finish their MAC operations at the same time. This is ensured due to the symmetric distribution of workload, ensured by design, over the 4 UBs. All 4 UBs write their allocated encoder cells' outputs to 4 different memory blocks (titled "memory output" in FIG. 4). Since each MB needs access to all of the encoder cells' outputs, each of these 4 different memory blocks are then multiplexed streamed serially onto a single bus [808]. This bus forms an input to the set of MBs shown in FIG. 8. All the 8 MBs will finish their MAC operations at the same time as well. All 8 MBs write their allocated memory cells' outputs to 8 different memory blocks (titled "memory output" in FIG. 5). Since each MB, HB and UB needs access to all of the memory cells' outputs, each of these 8 different memory blocks are then multiplexed streamed serially onto a single bus [810], which is connected to all UBs, HBs and MBs. Finally, the 4 HBs will finish their MAC operations at the same time as well. All 4 HBs write their allocated memory cells' outputs to 4 different memory blocks (titled "memory output" in FIG. 7). Since each UB and HB needs access to all of the hidden cells' outputs, each of these 4 different memory blocks are then multiplexed streamed serially onto a single bus [812], which is connected to all UBs and HBs.

Total energy consumption of the LMU computation block can be calculated by summing up individual energy consumption of its constituent set of encoder computation sub blocks (UB), constituent set of memory computation sub blocks (MB) and its constituent set of hidden computation sub blocks (HB).

For calculating the latency and throughput of an LMU computation block, the parallel mode of operation plays an important role. All constituent sub blocks in the set of constituent encoder computation sub blocks work in parallel. Same is true for the memory and hidden constituent set of computation sub blocks. Hence, the slowest UB sub block in finishing the computation of its allocated output units of the encoder cell determines the latency of the entire set of constituent encoder computation sub blocks. Similarly, the slowest MB sub block in finishing the computation of its allocated output units of the memory cell determines the latency of the entire set of constituent memory computation sub blocks. Finally, the slowest HB sub block in finishing the computation of its allocated output units of the hidden cell determines the latency of the entire set of constituent hidden computation sub blocks. Hence, to calculate the overall latency of an LMU computation block, the latency of the set of constituent encoder computation sub blocks can be added with the latency of the set of constituent memory computation sub blocks, which can then be added with the latency of the set of constituent hidden computation sub blocks. The throughput of the LMU computation block is determined by the slowest computation sub block, regardless of type.

Digital Hardware Implementation of Feed Forward Cell (FB)

Figure 9:
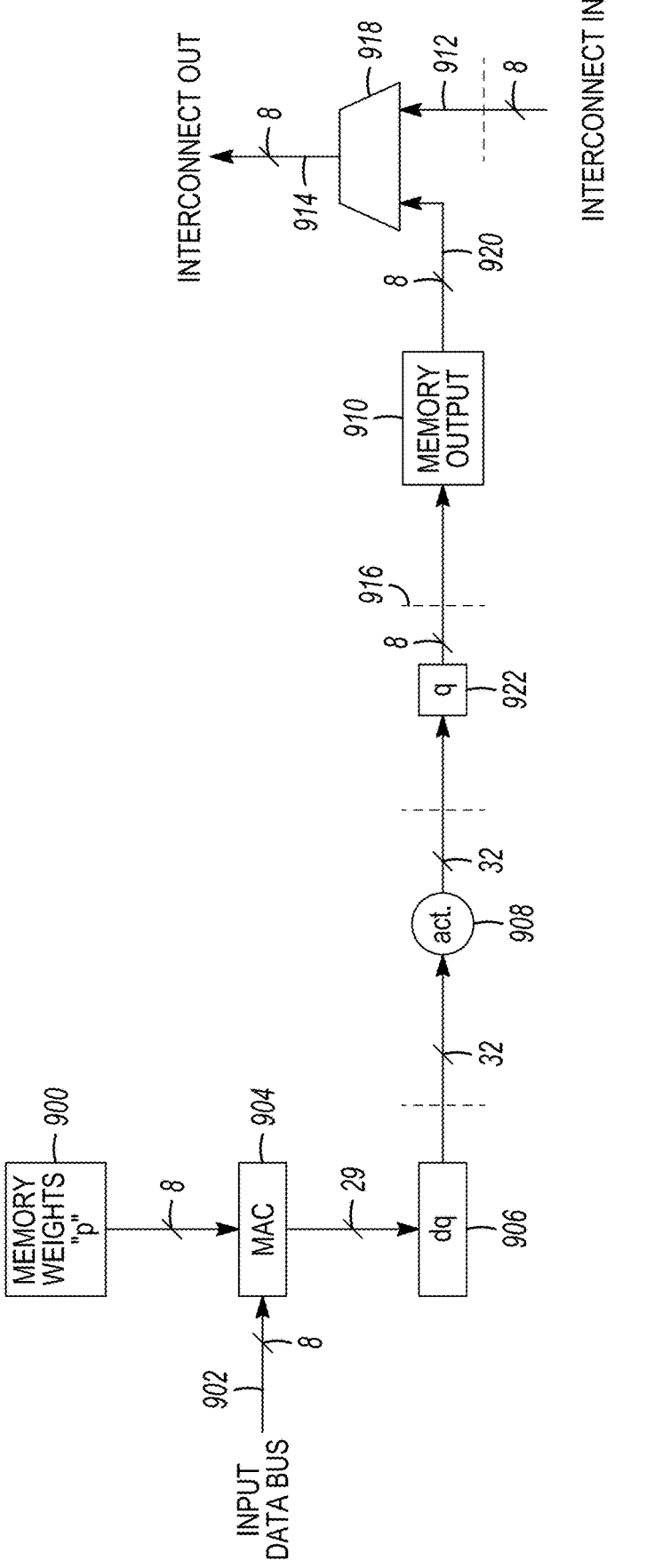
FIG. 9 illustrates a circuit embodiment of a feed forward cell's computation sub block (FB).

The digital hardware implementation of a feed forward computation block, comprises a plurality of one type of constituent computation sub blocks. A constituent sub block, computing one unit of feed forward cell output, is shown in FIG. 9. Each constituent computation sub block is denoted as $FB_i$, where i is the index of the computation sub blocks in a chain of FB computation sub blocks.

Similar to computation sub blocks introduced before, the cell's output computation will be temporally multiplexed in parallel over the allocated FBs.

As shown in FIG. 9, for producing an output of the feed forward cell, the set of weights are stored in a memory block [900]. Each of these weight sets only correspond to the appropriate output units assigned to it. These weights are then subsequently multiplied and accumulated with input flits from the input data bus [902] using the MAC block [904]. Resulting accumulated values are optionally transformed using hardware implementation of activations [908] and stored in output memory block [910]. Finally, the output line [920] of the output memory block is connected to a multiplexer [918] and a registered line [912] to support interfacing with a multiplexer based chain interconnect to support movement of data from this computation sub block to other computation sub blocks [914]. The memory blocks in FB can individually be, but not limited to, SRAM memory, DRAM memory, ROM memory, flash memory, solid state memory and can be either volatile or non volatile. The FB shown in FIG. 9 implements the following equation:

$$f_t = \sigma(W_x \odot x)$$

where $x_t$ is input at timestep t with $W_x$ being the weights respectively. $\sigma$ is an activation function. $\odot$ refers to a multiplication and accumulation of 2 input vectors.

As shown in FIG. 9, pipeline registers [916] are also optionally introduced along the data path to increase throughput of the computation. A register can be optionally introduced after any of the sub-module of the multiply and accumulate unit, hardware implementation of activation functions and memory blocks, etc.

As shown in FIG. 9, strategic quantization stages are also optionally introduced along the computation data path of FB. A plurality of quantization [922] and dequantization [906] blocks that descale a previously quantized input and requantize it to a plurality of bit widths can be optionally placed anywhere along the computation datapath. Optionally, the efficacy of a unique placement of these quantization blocks can be determined by training the neural network while replicating this quantization scheme in software and its impact on the performance of the neural network measured. The bit widths of other sub modules of multiply and accumulate unit, hardware implementation of activation functions and memory blocks, etc. will change according to the placement and bit widths of plurality of quantization blocks introduced. For example, in FIG. 9, different data path connections have a bit width of 8 [8], 29 [29] and 32 [32].

Modeling Energy Consumption of Digital Hardware Implementation of Feed Forward Cell (FB)

Similar to the previously introduced computation sub blocks, power and energy consumption of a computation sub block FB can also be divided into 2 categories: 1. static leakage power; and 2. dynamic switching energy and each of these can further be divided into: 1. scale variant; and 2. scale invariant categories introduced previously.

Similar to previously introduced computation sub blocks, inactive computation sub blocks can be disconnected from the voltage supply or put in low power mode using Dynamic Voltage and Frequency Scaling, as introduced previously.

Dynamic energy consumed by a feed forward computation sub block with index i (FB$_i$) with one output unit allocated is defined as E$^d_{i,FB}$. As discussed above, dynamic energy consumption is further divided according to its dependency on allocation (number of output units time multiplexed on to FB$_i$): E$^{d-sv}_{i,FB}$ as the scale variant portion of E$^d_{i,FB}$ and E$^{d-siv}_{i,FB}$ as the scale invariant portion. For FIG. 9, assuming forward connection to a feed forward computation sub block, they can be calculated as follows:

$$E^{d-sv}_{i,FB} = n_o \cdot {}^{8,8,29}E_{MAC}^{OP} + n_o {}^{8,8}E_{memory}^{r} + {}^{29,32}E_{dq}^{OP} + {}^{32,32}E_{act}^{OP} + {}^{32,8}E_q^{OP} + {}^{8,8}E_{memory}^{w} + (n_i/num\_FB_{next\_layer}) \cdot E_{memory}^{r} + 2 \cdot {}^{32,32}E_{reg}^{OP} + {}^{8,8}E_{reg}^{OP}$$

$$E^{d-siv}_{i,FB} = (n_i/num\_FB_{next\_layer}) \cdot (2 \cdot {}^{8,8,8}E_{2:1\ mux}^{OP} + \Sigma_{K=1}^{i} unit_k^{FB} \cdot {}^{8,8}E_{reg}^{OP})$$

Static power consumption of a feed forward computation sub block with index i (FB$_i$) with one output unit allocated is defined as P$^s_{i,FB}$. As discussed above, static power consumption is further divided according to its dependency on allocation (number of output units time multiplexed on to FB$_i$): P$^{s-sv}_{i,FB}$ as the scale variant portion of P$^s_{i,FB}$ and P$^{s-siv}_{i,FB}$ as the scale invariant portion. For FIG. 9, they can be calculated as follows:

$$P^{s-sv}_{i,FB} = n_o \cdot {}^{1 \times 8}P_{memory}^s \times {}^{1 \times 8}P_{memory}^s$$

$$P^{s-siv}_{i,FB} = {}^{8,8,29}P_{MAC}^s + {}^{29,32}P_{dq}^s + {}^{32,32}P_{act}^s + {}^{32,8}P_q^s + {}^{8,8,8}P_{2:1\ mux}^s + 2 \cdot {}^{32,32}P_{reg}^s + 2 \cdot {}^{8,8}P_{reg}^s$$

Total energy consumed by a feed forward computation sub block with index i (FB$_i$) can be written as below:

$$E^{N,total}_{i,FB} = N \cdot E^{d-sv}_{i,FB} + E^{d-siv}_{i,FB} + N \cdot P^{s-sv}_{i,FB} \cdot latency_{e2e} + P^{s-siv}_{i,FB} \cdot latency^i_{FB}$$

where latency$_{e2e}$ is the total latency of processing a given input of the recurrent neural network, latency$^i_{FB}$ is the latency of computation sub block FB$_i$ of processing all time multiplexed outputs allocated to it and N is the total number of output units time multiplexed onto FB$_i$.

Modeling Performance of Digital Hardware Implementation of Hidden Cell (FB)

Latency of a feed forward computation sub block with index i (FB$_i$) for processing N outputs, abbreviated as T$^N_{i,FB}$, can be calculated by adding up individual latencies of each operation involved in the computation of N output units. Similar to computation sub blocks introduced previously, a plurality of pipelining registers can be introduced to reduce the longest delay path and also increase throughput by filling up the data path with computation across multiple of these N units, thus shadowing critical stages of computation of chronologically newer output units behind critical stages of older output units. For the FB computation sub block shown in FIG. 9, assuming latency of 1 for each operation, it can be written as:

$$T^N_{i,FB} = (n_o \cdot N) + 4$$

Software Architecture of Mapping Algorithm

A mapping or allocation is defined as time multiplexing of whole or part of the above discussed recurrent neural network composed of at least one of: an LMU cell, an LSTM-P cell, and zero or more feed forward cells, onto a spatial distribution of plurality of corresponding types of computation blocks.

A partitioning of a neural network is defined as separating a sequence of layers of that network into a group such that all layers belonging to that group will be time multiplexed onto the same computation block. An entire neural network can be partitioned into multiple groups (also called partitions). Layers of different types cannot be partitioned into the same group. Hence, a new group must be formed when consecutive layers change types.

A mapping of a recurrent neural network into the computational blocks introduced above depends on the partitioning of the network as well as the number of each type of constituent computation sub blocks for that partition.

Figure 10:
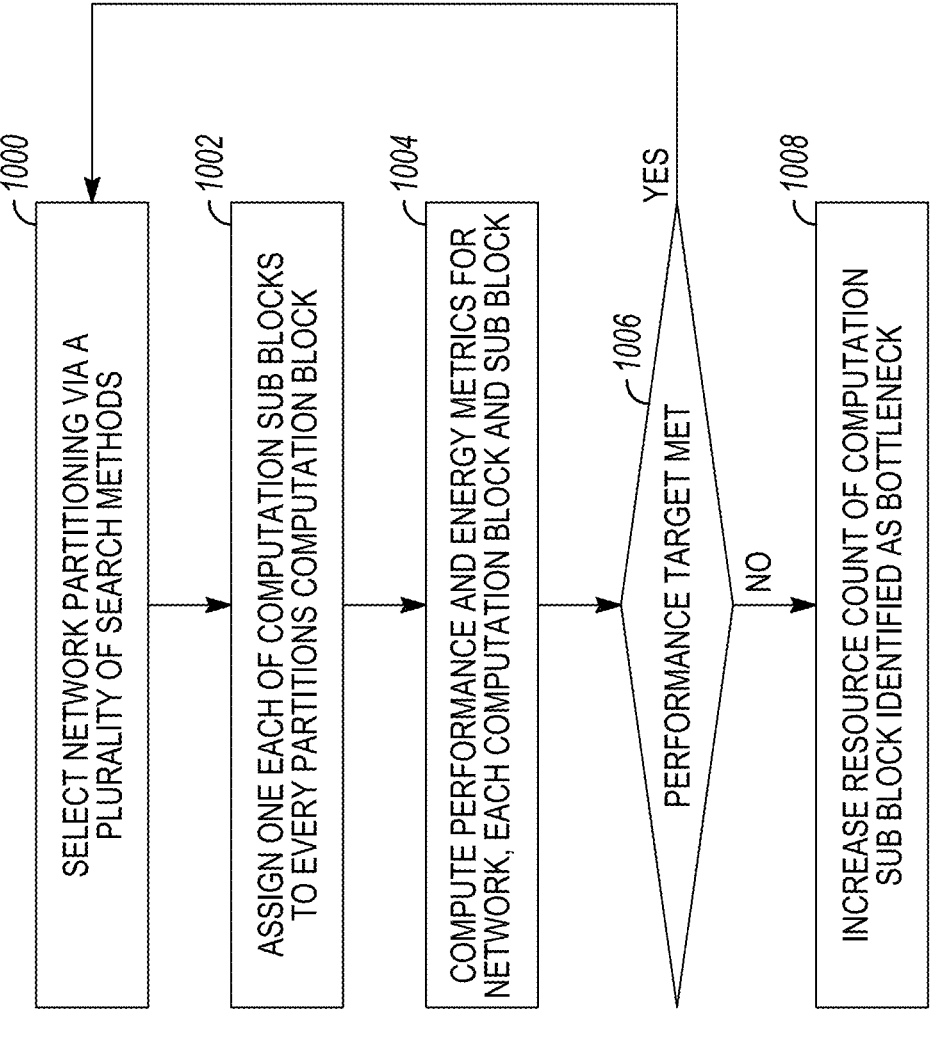
FIG. 10 illustrates a method according to one embodiment of the invention.

For discovering a mapping of a given recurrent neural network that comes closest to satisfying a user specified constraints of combination of latency, throughput, power and like, first, a linear search over all possible partitioning [1000] of the recurrent neural network is performed. For a large recurrent neural network where a linear search might be too slow, linear search can be replaced with intelligent search methods including but not limited to gradient based searches, evolutionary strategies guided searches, etc. For a partitioning, each partition's computation block is allocated one each of its constituent computation sub blocks [1002]. The total latency and energy consumption of the network is computed [1004] by adding up the latency and energy consumption of each partition's computation block using methods discussed previously. The throughput of the network is calculated by identifying the throughput of each partition's computation block and the slowest computation block determines the overall throughput of the network. At this stage, either the slowest computation block or the block, which if the count of its slowest constituent computation sub block was increased would lead to greatest decrease in latency, is chosen. The count of the slowest constituent computation sub block of the selected computation block is incremented by 1 [1008]. This process, labelled "iterative resource allocation" and shown in FIG. 10, of incrementing count of a computation sub block for a partitioning is repeated until either user specified constraints are met or any power or area constraints specified exceeded [1006]. Then the linear search moves onto the next partitioning and repeats this process of "iterative resource allocation".

Figure 11:
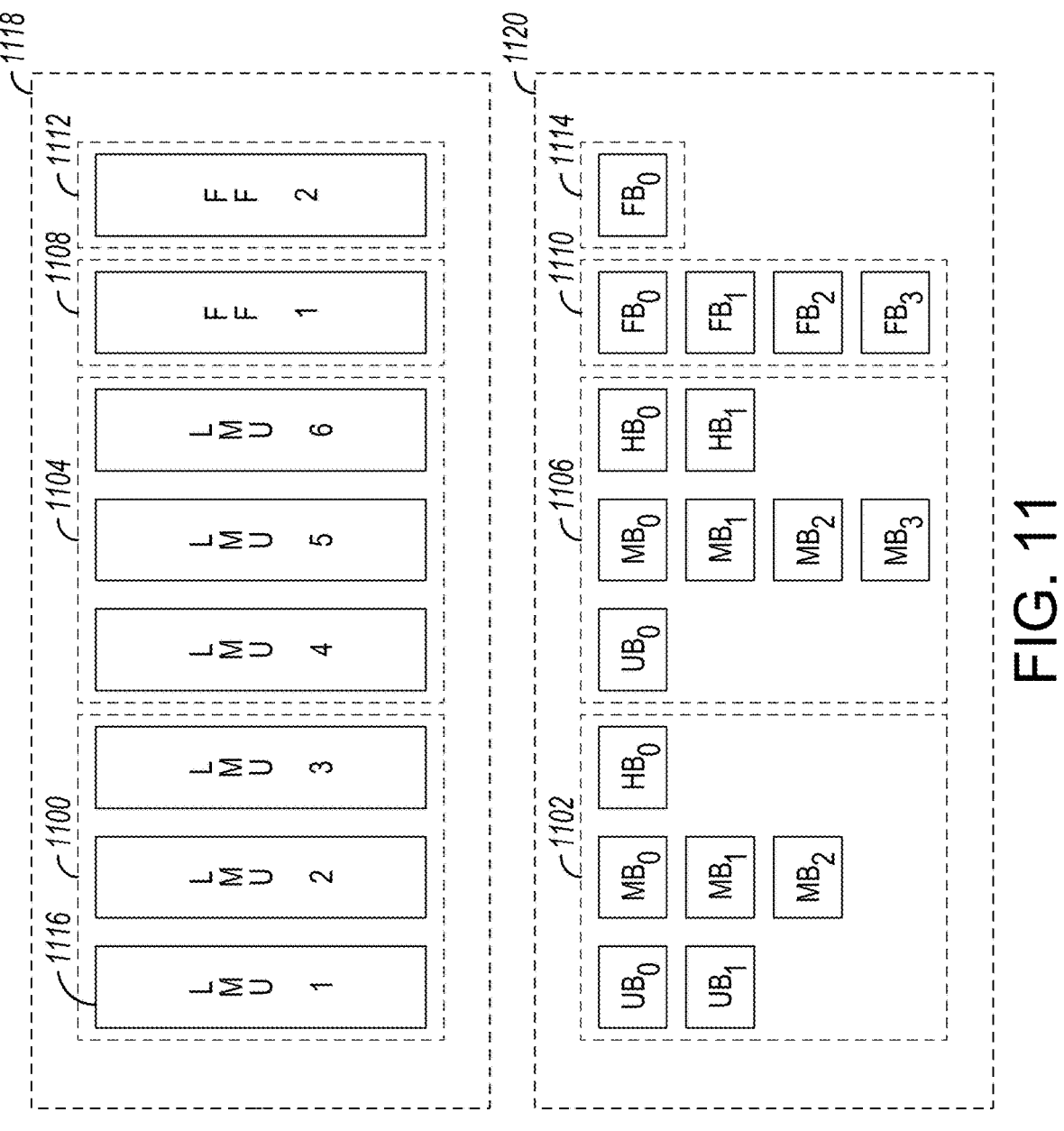
FIG. 11 illustrates an exemplary neural network on which one embodiment of the methods of this invention has been applied such that layers of the neural networks have been partitioned, each with a computation block constituent of its computation sub blocks.

FIG. 11 shows the final mapping [1120] of a recurrent neural network [1118], composed of 6 LMU cell layers, with [1116] being the first LMU layer, and 2 feed forward layers, partitioned into 4 partitions [1100], [1104], [1108], [1112] and mapped to a computation block of corresponding types [1102], [1106], [1110], [1114], with each computation block made up of different number of corresponding computation sub blocks, where all layers belonging to a partition will be time multiplexed onto the partition's computation block for processing.

Example of Low Power, Real Time Keyword Spotting

Figure 12:
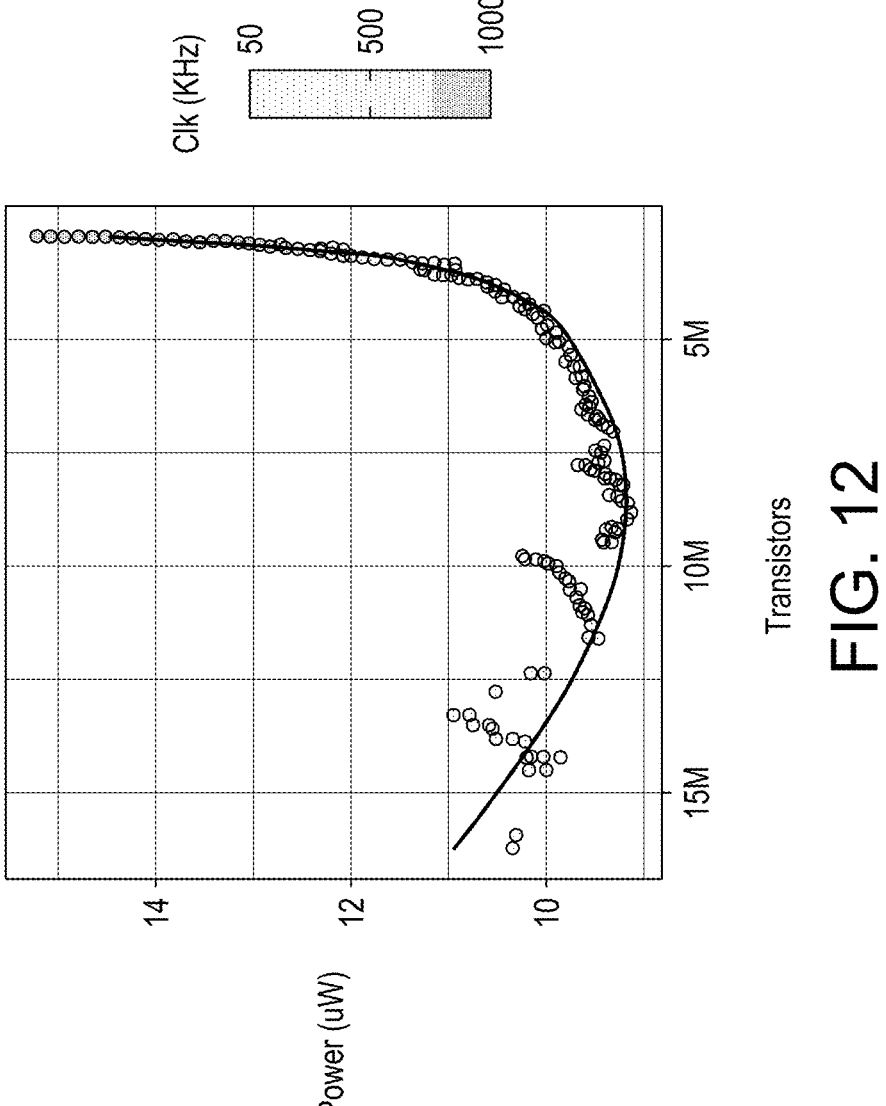
FIG. 12 illustrates the relationship between clock frequency, power consumption and transistor count of the resulting hardware design when embodiments of this invention are used to process an RNN.

A custom accelerator for keyword spotting applications is implemented using the above mentioned computational blocks and mapping techniques. The custom accelerator is a mapping of an LMU based recurrent neural network that has been trained to achieve 95.9% test accuracy on the Speech-Commands dataset (see Warden, P., 2018. Speech commands: A dataset for limited-vocabulary speech recognition. arXiv preprint arXiv:1804.03209). The LMU based recurrent neural network is 361 kbits in size. The computation blocks are configured to use 4 bit quantized weights and 7 bit quantized activations and use SRAM as memory blocks. The recurrent neural network is then trained with these quantization settings to mimic hardware aware training. The design of the hardware accelerator was explored across different clock frequencies, while always ensuring that the timing constraints of the SpeechCommands models (40 ms windows updated every 20 ms) are satisfied in real time. Cycle-accurate power envelopes of each design were guided by the above discussed power and energy estimation models for each computation block that makes up the hardware accelerator design. Total power usage is determined with these envelopes using publicly available power data (see Frustaci, F., Khayatzadeh, M., Blaauw, D., Sylvester, D. and Alioto, M., 2015. SRAM for error-tolerant applications with dynamic energy-quality management in 28 nm CMOS. IEEE Journal of Solid-state circuits, 50(5), pp. 1310-1323) (see Hoppner, S. and Mayr, C., 2018. SpiNNaker2-towards extremely efficient digital neuromorphics and multi-scale brain emulation. Proc. NICE) (see Yabuuchi, M., Nii, K., Tanaka, S., Shinozaki, Y., Yamamoto, Y., Hasegawa, T., Shinkawata, H. and Kamohara, S., 2017, June. A 65 nm 1.0 V 1.84 ns Silicon-on-Thin-Box (SOTB) embedded SRAM with 13.72 nW/Mbit standby power for smart IoT. In 2017 Symposium on VLSI Circuits (pp. C220-C221). IEEE). Multiply-accumulate (MAC) and SRAM dynamic and static power, are the dominant power consumers in the design. Dynamic power for multipliers, dividers, and other components was estimated as a function of the number of transistors in the component, and the power cost per transistor of the MAC. All estimates are for a 22 nm process. To estimate the number of transistors, and hence the area, of the design we generated RTL designs of each of the relevant components, and used the yosys open source tool (see Wolf, C., 2016. Yosys open synthesis suite) and libraries to estimate the number of transistors required for the total number of components included in our network. FIG. 12 shows the resulting power/area trade-off for our LMU based design. Note that all designs depicted are real-time capable. We observe increased power and area consumption when operating in the realm of low frequency, directly attributed to requiring additional resources to meet real time constraints along with dynamic switching of "glue" logic to support parallel operations of these resources. As we increase frequency, it becomes easier to maintain real time operations, thus progressively reducing resources required. We then reach the lowest power design, found at 8.79 μW (92 kHz clock) and 8,052,298 transistors. For this design, the throughput for one 20 ms frame is 13.38 ms and the latency for the 40 ms update is 39.59 ms. Beyond this optimal design point, any increase in frequency is met with a sharp rise in power, explained by the design becoming faster than real time, thus requiring no additional resources but disproportionately decreasing end-to-end latency.

Example of Low Power, Real Time Automatic Speech Recognition

A custom accelerator for implementing the RNN-T network for automatic speech recognition (see He, Y., Sainath, T. N., Prabhavalkar, R., McGraw, I., Alvarez, R., Zhao, D., Rybach, D., Kannan, A., Wu, Y., Pang, R. and Liang, Q., 2019, May. Streaming end-to-end speech recognition for mobile devices. In ICASSP 2019-2019 IEEE International Conference on Acoustics, Speech and Signal Processing (ICASSP) (pp. 6381-6385). IEEE) is implemented using the above mentioned computational blocks and mapping techniques. The computation blocks are configured to use 8 bit quantized weights and 8 bit quantized activations and use SRAM as memory blocks. The design of the hardware accelerator was fixed at 250 MHz, while always ensuring that the accelerator is able to process an entire input sample in less than 60 ms. Cycle-accurate power envelopes of the design were guided by the above discussed power and energy estimation models for each computation block that makes up the hardware accelerator design. Total power usage is determined with these envelopes using publicly available power data (see Frustaci, F., Khayatzadeh, M., Blaauw, D., Sylvester, D. and Alioto, M., 2015. SRAM for error-tolerant applications with dynamic energy-quality management in 28 nm CMOS. IEEE Journal of Solid-state circuits, 50(5), pp. 1310-1323) (see Hoppner, S. and Mayr, C., 2018. SpiNNaker2-towards extremely efficient digital neuromorphics and multi-scale brain emulation. Proc. NICE) (see Yabuuchi, M., Nii, K., Tanaka, S., Shinozaki, Y., Yamamoto, Y., Hasegawa, T., Shinkawata, H. and Kamohara, S., 2017, June. A 65 nm 1.0 V 1.84 ns Silicon-on-Thin-Box (SOTB) embedded SRAM with 13.72 nW/Mbit standby power for smart IoT. In 2017 Symposium on VLSI Circuits (pp. C220-C221). IEEE). All estimates are for a 22 nm process. We forego analysis of small components like multiplexers, registers, etc in our power model. Instead, we focus only on the widely agreed-upon energy sinks: 1. MAC operations and 2. SRAM based operations. We explored 3 different cases of mapping using the LSTM-P as a reference for the size of the LMU to be used in the RNN-T network:

1. In the first case, we set the dimensions of the LMU to be the same as that of the LSTM-P used in the RNN-T architecture (see He, Y., Sainath, T. N., Prabhavalkar, R., McGraw, I., Alvarez, R., Zhao, D., Rybach, D., Kannan, A., Wu, Y., Pang, R. and Liang, Q., 2019, May. Streaming end-to-end speech recognition for mobile devices. In ICASSP 2019-2019 IEEE International Conference on Acoustics, Speech and Signal Processing (ICASSP) (pp. 6381-6385). IEEE). In this case, we set the dimension of the memory cell to be 2048 and the dimension of the hidden cell to be 640 in the LMU.

2. In the second case, we trained both the LSTM-P version and the LMU version of the networks for Librispeech (see Panayotov, V., Chen, G., Povey, D. and Khudanpur, S., 2015, April. Librispeech: an ASR corpus based on public domain audio books. In 2015 IEEE international conference on acoustics, speech and signal processing (ICASSP) (pp. 5206-5210). IEEE) to accuracy parity. We then calculated the ratio of the LMU dimensions versus the LSTM-P dimensions used in this task. We then scaled the RNN-T LSTM-P's dimensions by the same ratio and set the resulting numbers to be the dimensions of the LMU.

3. In the third case, we followed the same Librispeech strategy for scaling. However, this time we used the TIMIT corpus (see Garofolo, J. S., Lamel, L. F., Fisher, W. M., Fiscus, J. G. and Pallett, D. S., 1993. DARPA TIMIT acoustic-phonetic continuous speech corpus CD-ROM. NIST speech disc 1-1.1. NASA STI/Recon technical report n, 93, p. 27403) as our target dataset.

For the RNN-T network, we generated a total of 1024 partition combinations corresponding to increasingly partitioning the network (1 partition to 12 partitions) and then generating all possible combinations for that set number of partitions. For each partition combination, we derived the spatial configuration of computation blocks and time multiplexing of these partitions onto said computation blocks using our mapping algorithm. We used the performance and power models of computation blocks described above to derive latency and power numbers at every step of iterative resource allocation.

Before sharing the results for the LMU, we first share the details of the LSTM-P's performance:

Throughput: The optimal mapping will be able to accept a new sample of 60 ms every 9.83 ms. This translates to a throughput of 101.72 audio samples per second Latency: This mapping will be able to process an input sample of 60 ms and generate the output after 59.99 ms.

Power Consumption: The network will consume 8.62 mW of power to process this sample Mapping details: Count of constituent computation sub blocks for each computation block of partition is shown below for optimal mapping.

Partition containing Encoder Layer 1: [8 LB, 4 PB]

Partition containing Encoder Layer 2: [4 LB, 1 PB]

Partition containing Encoder Layer 3: [3 LB, 1 PB]

Partition containing Encoder Layer 4: [3 LB, 1 PB]

Partition containing Encoder Layer 5: [3 LB, 1 PB]

Partition containing Encoder Layer 6: [3 LB, 1 PB]

Partition containing Encoder Layer 7, Encoder Layer 8, Prediction Layer 1, Prediction Layer 2: [23 LB, 4 PB]

Partition containing Feed Forward Joint Network Layer: 2 FF

Partition containing Feed Forward Softmax Layer: 4 FF

We now share the results of the optimal mapping for the 3 different cases of LMU sizes as discussed above. For the case of setting LMU dimensions equal to the LSTM-P's dimensions, we use LMU for the recurrent connections in place of the LSTM-P. For the optimal mapping, all layers are mapped into their separate partitions, except the prediction network where 2 layers making it up are mapped onto a single partition. We now discuss the throughput, latency and power numbers for this mapping.

Throughput: This mapping will be able to accept a new sample of 60 ms every 7.716 ms. This translates to a throughput of 129.6 audio samples per second Latency: This mapping will be able to process an input sample of 60 ms and generate the output after 59.65 ms.

Power Consumption: The network will consume 2.39 mW of power to process this sample Resource Allocation: Resource level distribution is shown below now. Remember that an LMU RNN (section 2.2) is made up of 3 processing sub blocks per layer: UB, MB and HB. A Feed Forward Layer (section 2.4) is made up of a single processing block called FB.

Partition containing Encoder Layer 1: [1 UB, 9 MB, 3 HB]

Partition containing Encoder Layer 2: [1 UB, 8 MB, 3 HB]

Partition containing Encoder Layer 3: [1 UB, 4 MB, 2 HB]

Partition containing Encoder Layer 4: [1 UB, 4 MB, 2 HB]

Partition containing Encoder Layer 5: [1 UB, 4 MB, 2 HB]

Partition containing Encoder Layer 6: [1 UB, 4 MB, 2 HB]

Partition containing Encoder Layer 7: [1 UB, 4 MB, 2 HB]

Partition containing Encoder Layer 8: [1 UB, 4 MB, 2 HB]

Partition containing Prediction Layer 1, Prediction layer 2: [1 UB, 15 MB, 10 HB]

Partition containing Feed Forward Joint Network Layer: 2 FF

Partition containing Feed Forward Softmax Layer: 5 FF

For the second case, we calculated the ratio between the size of LSTM-P and LMUs used in achieving similar accuracy for the Librispeech dataset. We observed that the best LMU was roughly one-third the size of the best LSTM-P in this experiment. In the equal dimensions experiment, the LMU is roughly six times smaller than the LSTM-P. This equates to a scaling factor of 2. Hence we expect that were a similar scaling factor used in the RNN-T network to achieve accuracy parity, the LMU would consume roughly twice the power of the equal dimensions experiment. This results in power consumption of 4.78 mW.

For the third case, we calculated the ratio between the size of LSTM-P and LMUs used in achieving similar accuracy for the TIMIT dataset. We measured the dimension of the best performing LMU and the best performing LSTM-P. We then scaled the dimensions of the LSTM-P in the RNN-T by these ratios to arrive at the LMU dimensions. Hence we expect that were this LMU used in the RNN-T network to achieve accuracy parity, it would consume 4.4 mW of power.

Figure 13:
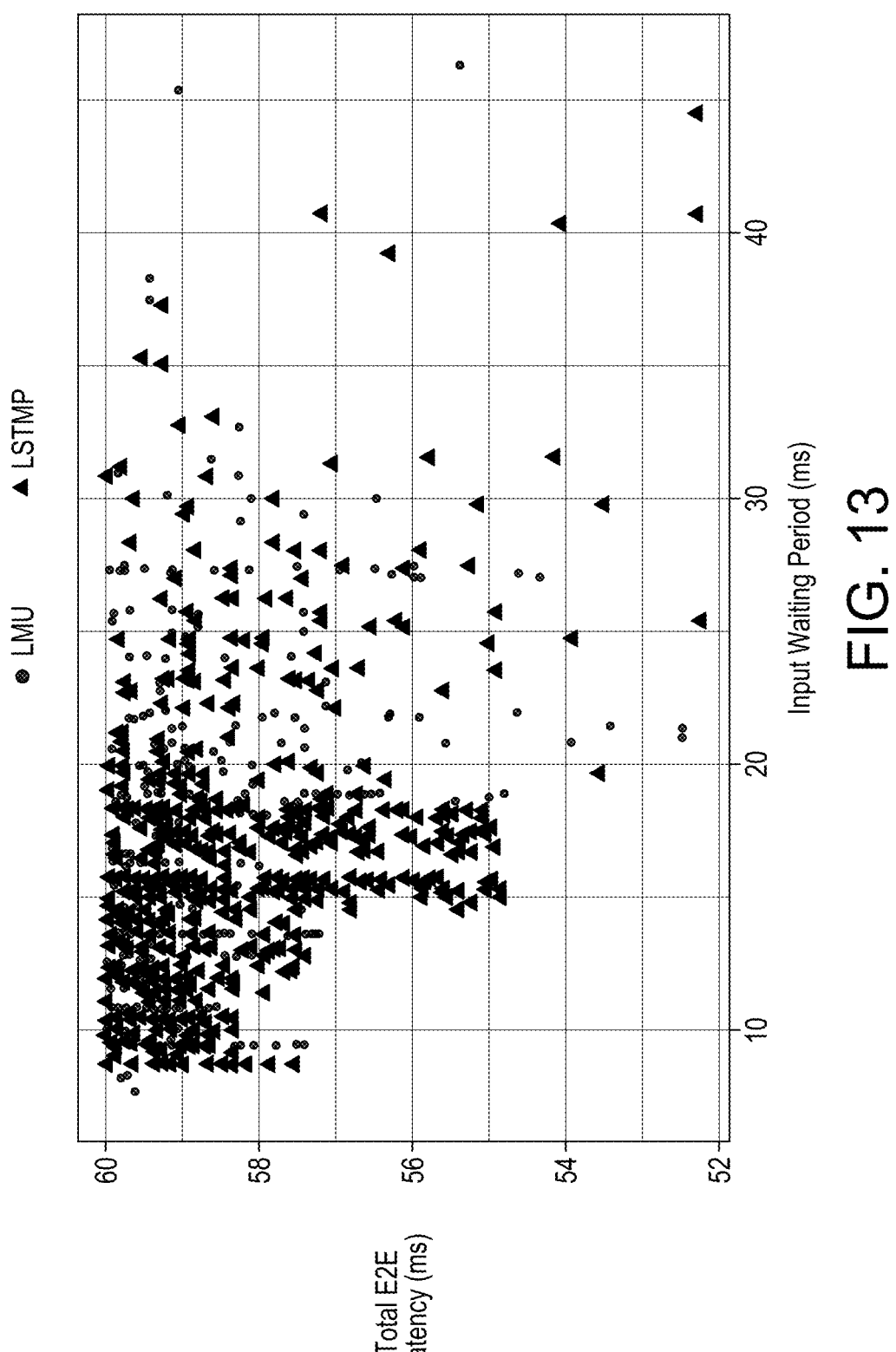
FIG. 13 illustrates the relationship between throughput and end to end latency of the resulting hardware design when embodiments of this invention are used to process an RNN with LSTM-P or LMU as the recurrent cell choice.

We now present additional details about this experiment. We first focus on the increased power consumption of the mapping of the RNN-T network built with LSTM-P vs the RNN-T network built with LMUs. The RNN-T network built with LSTM-P consumes 145.4 MB of SRAM memory. This is approximately 6× larger than the RNN-T built with LMU's 26 MB. Hence, the static power consumption of the memory for an LSTM-P implementation pushes it into the domain of infeasibility. We also explore the relationship between partitions of the RNN-T and associated power consumption of optimal mapping of that partition combination. Any partition combination can achieve an end-to-end latency of less than 60 ms. The important thing is for it to do so while consuming as little power as possible. FIG. 13 presents the final latency on the y axis and the waiting period (1/throughput) on the x axis for the case of equal dimension LMU and LSTM-P. The best sample would be the one that would lie bottom left, that is, have lowest latency and input waiting period. Note that we do not show power here. All the LSTM-P points consume more than 5 mW here. Also another thing to remember is that we stop dynamic allocation once we reach 60 ms latency. For this discussion, the best partition combination is by an LMU implementation with an input waiting period of 7.716 ms and end-to-end latency of 59.65 ms.

Figure 14:
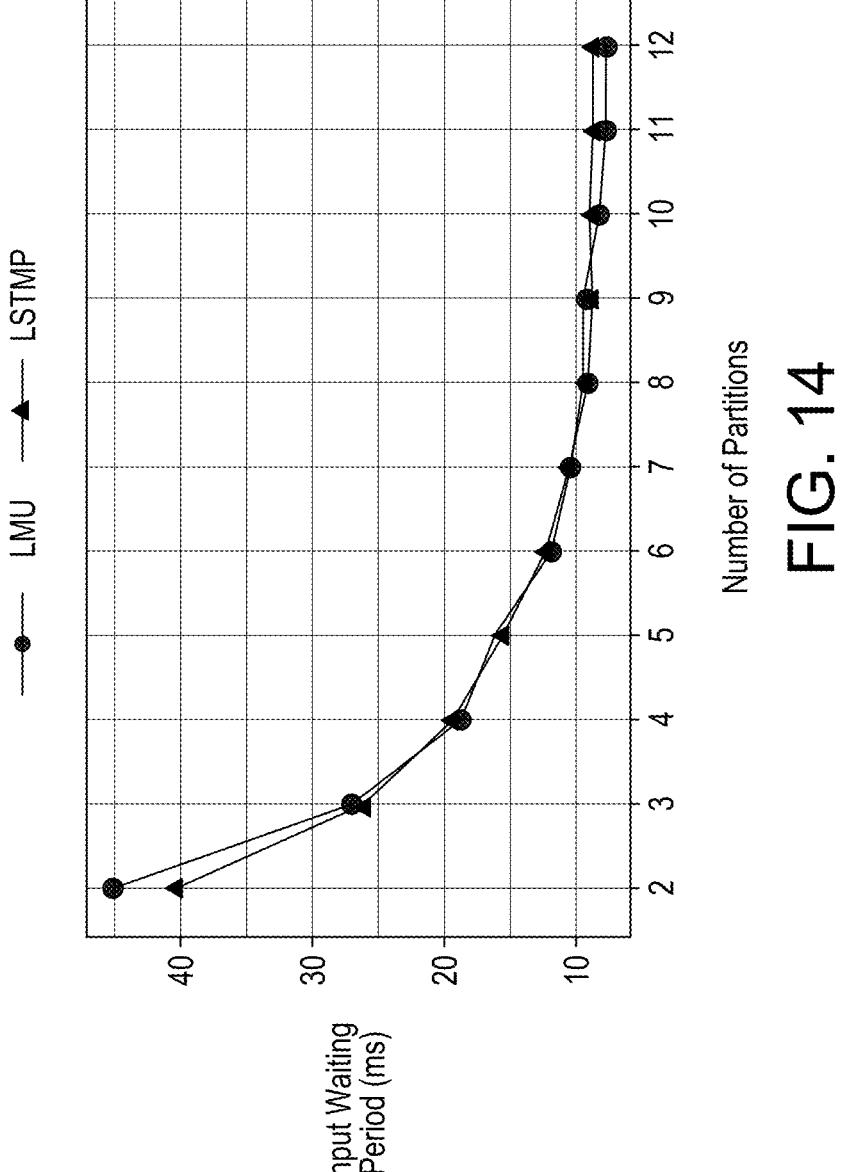
FIG. 14 illustrates the relationship between throughput and number of partitions of the resulting hardware design when embodiments of this invention are used to process an RNN with LSTM-P or LMU as the recurrent cell choice.

We now focus on the relationship between throughput of hardware mappings and the number of partitions in FIG. 14. We analysed the best possible throughput achieved after iterative resource allocation by a partition combination of certain number of partitions for the case of equal dimensions LMU and LSTM-P. Remember that there are $^{12}C_N$ possible combinations if we split the network into N partitions. For a particular N (x-axis), we found the combination out of $^{12}C_N$ that achieves the best throughput and plotted that. The overall trend is that as we increase the number of partitions, the overall throughput is decreased since each partition has to increasingly do less work as less and less layers are mapped onto it. However, note that as we increasingly partition, we get diminishing returns. This is because the dependency of the prediction network's input on the previous output of the entire network imposes a strict critical path that cannot be partitioned further. This starts to dominate the overall throughput and hence, there are no benefits to partitioning beyond a point.

Figure 15:
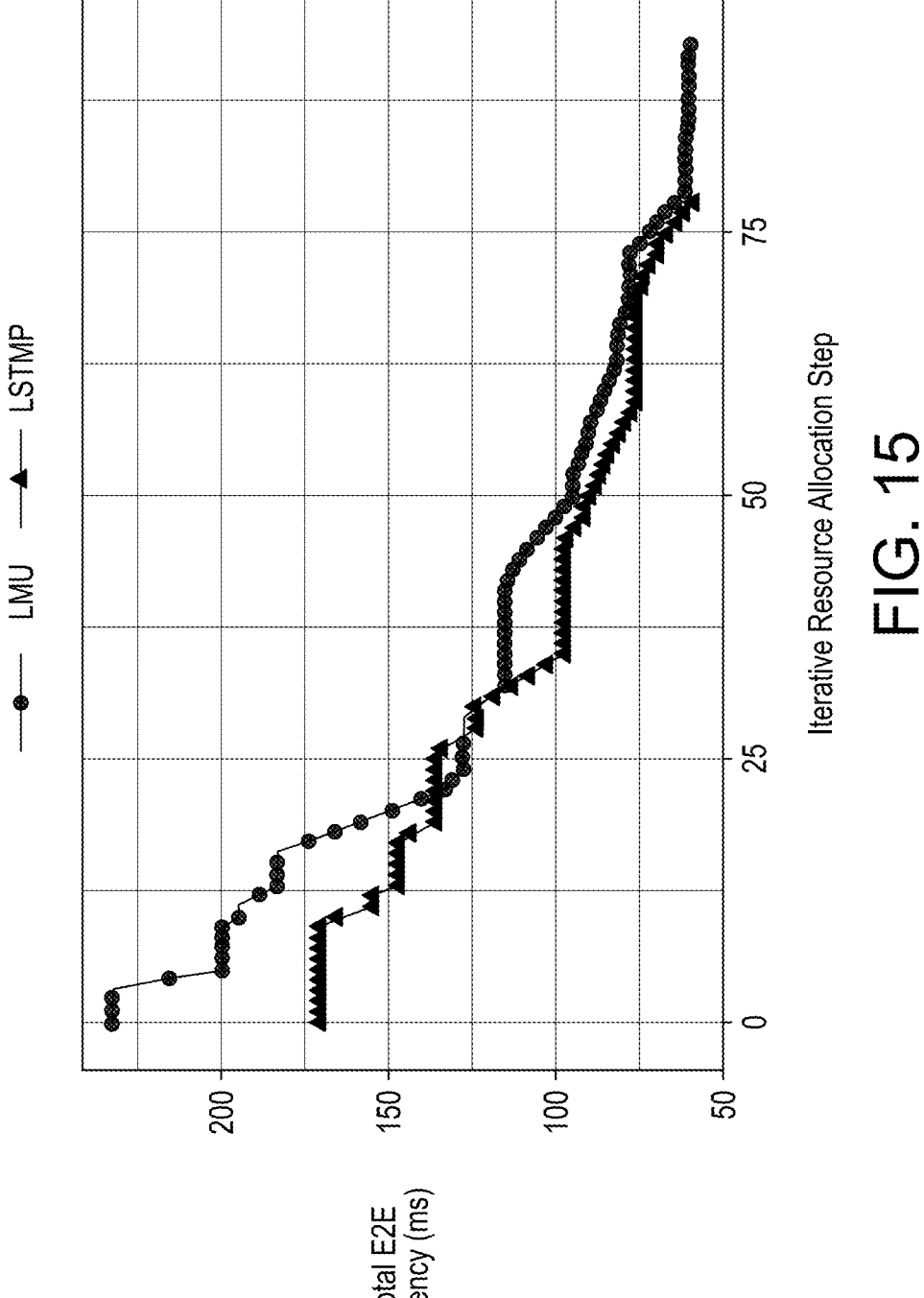
FIG. 15 illustrates the relationship between end to end latency and the step of iterative resource allocation of the resulting hardware design when embodiments of this invention are used to process an RNN with LSTM-P or LMU as the recurrent cell choice.

We now correlate latency trends with steps of iterative resource allocation. Recall that each step in iterative resource allocation finds the bottleneck and adds more resources to that computation sub block. For this analysis, we show network's latency (y axis) evolution through steps of iterative resource allocation (x-axis) in FIG. 15 for the case of equal dimension LMU and LSTM-P. The network initially has 2 partitions, sliced at the interface of RNN layers' output with Feed Forward layers' input. Note that, as expected, the general trend is for latencies to decrease as we increase the number of partitions. However, note that LSTM-P based implementation generally is faster than LMU at any iterative resource allocation step. Furthermore, it is quicker to reach 60 ms end-to-end latency (which is where iterative resource allocation stops). This is because there is less amount of parallelism to take advantage of in LMU when compared to an LSTM-P and greater amount of data dependency within a timestep. Owing to the increased depth of computation and dependency of one step on the previous, there is less scope of distributing the computations in parallel. Hence, we return with a slightly higher end to end latency in the case of an LMU implementation. The LMU overall requires less computation but the compute is nested deeper and cannot be distributed as well when compared to the LSTM-P.

We claim:

1. A digital hardware system for implementing a recurrent neural network, the digital hardware system comprising:

at least one Legendre Memory Unit (LMU) cell computation block, each LMU cell computation block receiving input via an input bus, each LMU cell computation block comprising a digital hardware implementation of an encoder cell computation sub block set comprising one or more encoder cell computation sub blocks, a memory computation sub block set comprising one or more memory computation sub blocks, and a hidden computation sub block set comprising one or more hidden computation sub blocks;

each encoder cell computation sub block of the encoder cell computation sub block set connected to the input bus to receive the input, each encoder cell computation sub block of the encoder cell computation sub block set connected via a first bus to receive output from the memory computation sub block set and each encoder cell computation sub block of the encoder cell computation sub block set connected via a second bus to receive output from the hidden computation sub block set;

each memory computation sub block of the memory computation sub block set connected via a third bus to receive output from the encoder cell computation sub block set, and connected via the first bus to receive the output from the memory computation sub block set;

each hidden computation sub block of the hidden computation sub block set connected to the input bus to receive the input, each hidden computation sub block of the hidden computation sub block set connected via the first bus to receive the output from the memory computation sub block set, and each hidden computation sub block of the hidden computation sub block set connected via the second bus to receive the output from the hidden computation sub block set, an output of the at least one LMU cell computation block connected to a next block of the digital hardware system.

2. The digital hardware system of claim 1, wherein:

the output of each memory computation sub block of the memory computation sub block set is transmitted in a multiplexed serial stream on the first bus;

the output of each hidden computation sub block of the hidden computation sub block set is transmitted in a multiplexed serial stream on the second bus; and the output of each encoder cell computation sub block of the encoder cell computation sub block set is transmitted in a multiplexed serial stream on the third bus.

3. The digital hardware system of claim 1, wherein the encoder cell computation sub block set comprises a plurality of encoder cell computation sub blocks.

4. The digital hardware system of claim 3, wherein the memory computation sub block set comprises a plurality of memory computation sub blocks.

5. The digital hardware system of claim 4, wherein the hidden computation sub block set comprises a plurality of hidden computation sub blocks.

6. The digital hardware system of claim 5, wherein the encoder cell computation sub blocks of the encoder cell computation sub block set are configured to complete operations at the same time; the memory computation sub blocks of the memory computation sub block set are configured to complete operations at the same time; and the hidden computation sub blocks of the hidden computation sub block set of are configured to complete operations at the same time.

7. The digital hardware system of claim 1, wherein the memory computation sub block set comprises a plurality of memory computation sub blocks.

8. The digital hardware system of claim 1, wherein the hidden computation sub block set comprises a plurality of hidden computation sub blocks.

9. The digital hardware system of claim 1, wherein each encoder cell computation sub block comprises:

an input multiplexer;

a first portion comprising a first memory block storing weights and a first multiply and accumulate (MAC) unit, the first MAC unit connected to receive input from the input multiplexer and the first memory block;

a second portion comprising a second memory block storing weights and a second MAC unit, the second MAC unit connected to receive input from the input bus and the second memory block;

an adder for summing results of the first and second portions; and an output memory block for storing a result of the encoder cell computation sub block.

10. The digital hardware system of claim 9, wherein each encoder cell computation sub block further comprises an activation block for executing an activation function on output of the adder.

11. The digital hardware system of claim 1, wherein each memory computation sub block comprises:

a first portion comprising a first MAC unit, the first MAC unit connected to receive, as input, corresponding first input weights and the output from the memory computation sub block set;

a second portion comprising a second MAC unit, the second MAC unit connected to receive, as input, corresponding second input weights and the output from the encoder cell computation sub block set;

an adder for summing results of the first and second portions; and an output memory block for storing a result of the memory computation sub block.

12. The digital hardware system of claim 11, wherein each memory computation sub block further comprises an activation block for executing an activation function on output of the adder.

13. The digital hardware system of claim 11, wherein each memory computation sub block MB-further comprises circuitry for generating the first input weights and the second input weights in real time.

14. The digital hardware system of claim 11, wherein each of the first portion and second portion of each memory computation sub block further comprises a corresponding memory block for storing the corresponding first input weights and second input weights.

15. The digital hardware system of claim 1, wherein each hidden computation sub block comprises:

an input multiplexer;

a first portion comprising a first memory block storing weights and a first MAC unit, the first MAC unit connected to receive input from the input multiplexer and the first memory block;

a second portion comprising a second memory block storing weights and a second MAC unit, the second MAC unit connected to receive input from the input bus and the second memory block;

an adder for summing results of the first and second portions; and an output memory block for storing a result of the hidden computation sub block.

16. The digital hardware system of claim 15, wherein each hidden computation sub block further comprises an activation block for executing an activation function on output of the adder.

17. The digital hardware system of claim 1, wherein the recurrent neural network is configured for processing time series data.

* * * * *